US011051156B2

(12) United States Patent
O'Connor et al.

(10) Patent No.: US 11,051,156 B2
(45) Date of Patent: *Jun. 29, 2021

(54) TRACKING AND ACCOUNTABILITY DEVICE AND SYSTEM

(71) Applicant: 3AM INNOVATIONS LLC, Grand Island, NY (US)

(72) Inventors: Patrick O'Connor, Grand Island, NY (US); Robert Samuels, Buffalo, NY (US); Ryan David Litt, Buffalo, NY (US)

(73) Assignee: 3AM INNOVATIONS LLC, Grand Island, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,882

(22) Filed: Dec. 16, 2019

(65) Prior Publication Data

US 2020/0145808 A1    May 7, 2020

Related U.S. Application Data

(63) Continuation of application No. 15/826,108, filed on Nov. 29, 2017, now Pat. No. 10,511,951, which is a
(Continued)

(51) Int. Cl.
*H04W 4/90* (2018.01)
*H04W 4/029* (2018.01)
(Continued)

(52) U.S. Cl.
CPC ............ *H04W 4/90* (2018.02); *G01C 21/165* (2013.01); *G01C 21/206* (2013.01); *G01K 1/026* (2013.01);
(Continued)

(58) Field of Classification Search
CPC ...... H04W 4/90; H04W 4/029; G01C 21/165; G01C 21/206; G01K 1/026; G01K 1/024; H04M 1/72538
(Continued)

(56) References Cited

U.S. PATENT DOCUMENTS 7,091,852 B2    8/2006  Mason et al.
7,245,216 B2    7/2007  Burkley et al.
(Continued)

FOREIGN PATENT DOCUMENTS

JP    2014-169931 A    9/2014
WO    2010073713 A1    7/2010

OTHER PUBLICATIONS

International Search Report and Written Opinion for corresponding PCT/2017/068225 dated Mar. 13, 2018 and dated Apr. 19, 2018 (15 pages).
(Continued)

*Primary Examiner* — John A Tweel, Jr.
(74) *Attorney, Agent, or Firm* — Jodi A. Reynolds, Esq.; Harter Secrest & Emery LLP

(57) ABSTRACT

A tracking and accountability system and apparatus is provided and comprises a command unit and processing unit coupled to a wireless communication network, a first tracking device having a first mobile transceiver in communication with the wireless communication network and coupled to a first set of identification data of a first individual and being operative to transmit signals representing the first individual's location over the wireless communication network to the processing unit, and a second tracking device having a second mobile transceiver and coupled to a second set of identification data of a second individual and being operative to transmit signals representing the second individual's location (i) to the processing unit over the wireless
(Continued)

communication network if the second tracking device is within a first distance; and (ii) to the first tracking device if the second tracking device is within the first distance to the first tracking device.

28 Claims, 15 Drawing Sheets

Related U.S. Application Data continuation-in-part of application No. 15/407,637, filed on Jan. 17, 2017, now Pat. No. 9,828,791.

(51) Int. Cl.

| | |
|---|---|
| G01C 21/16 | (2006.01) |
| G01C 21/20 | (2006.01) |
| G06K 19/07 | (2006.01) |
| G01K 1/02 | (2021.01) |
| G06Q 50/28 | (2012.01) |
| H04W 4/02 | (2018.01) |
| H04W 4/021 | (2018.01) |
| H04W 84/18 | (2009.01) |
| H04L 29/08 | (2006.01) |
| H04M 1/72421 | (2021.01) |
| G01S 19/42 | (2010.01) |
| H04W 4/80 | (2018.01) |

(52) U.S. Cl.
CPC ..... *G06K 19/0717* (2013.01); *G06K 19/0723* (2013.01); *G06Q 50/28* (2013.01); *H04L 67/12* (2013.01); *H04M 1/72421* (2021.01); *H04W 4/02* (2013.01); *H04W 4/021* (2013.01); *H04W 4/023* (2013.01); *H04W 4/029* (2018.02); *H04W 84/18* (2013.01); *G01K 2213/00* (2013.01); *G01S 19/42* (2013.01); *H04W 4/80* (2018.02)

(58) Field of Classification Search
USPC .................................................. 340/539.13
See application file for complete search history.

(56) References Cited

U.S. PATENT DOCUMENTS

| | | | | |
|---|---|---|---|---|
| 7,545,281 | B2* | 6/2009 | Richards | ................... G01S 1/20 |
| | | | | 340/539.13 |
| 8,200,186 | B2* | 6/2012 | Ashley, Jr. | ............. G08G 1/005 |
| | | | | 455/404.2 |
| 9,316,501 | B2 | 4/2016 | Haverinen | |
| 9,473,920 | B2* | 10/2016 | Leahy | ..................... H04W 4/90 |
| 9,476,717 | B2 | 10/2016 | Haverinen et al. | |
| 9,521,522 | B2 | 12/2016 | Haverinen | |
| 9,544,730 | B2 | 1/2017 | Haverinen | |
| 9,599,473 | B2 | 3/2017 | Haverinen | |
| 9,674,672 | B1 | 6/2017 | Haverinen et al. | |
| 9,858,791 | B1* | 1/2018 | O'Connor | ............. G08B 21/12 |
| 10,511,951 | B2* | 12/2019 | O'Connor | ............. H04W 4/021 |
| 2004/0021569 | A1 | 2/2004 | Lepkofker et al. | |
| 2004/0080421 | A1 | 4/2004 | Wunderlich | |
| 2005/0001720 | A1* | 1/2005 | Mason | ................... G01S 5/0072 |
| | | | | 340/539.13 |
| 2006/0125630 | A1* | 6/2006 | Parkulo | ................. H04W 84/18 |
| | | | | 340/539.12 |
| 2007/0001904 | A1 | 1/2007 | Mendelson | |
| 2007/0159986 | A1 | 7/2007 | Park et al. | |
| 2008/0077326 | A1* | 3/2008 | Funk | ..................... G08B 25/016 |
| | | | | 701/500 |
| 2008/0246652 | A1 | 10/2008 | Lewis | |
| 2008/0314681 | A1* | 12/2008 | Patel | ........................ A62B 3/00 |
| | | | | 182/18 |
| 2009/0043504 | A1 | 2/2009 | Bandyopadhyay et al. | |
| 2010/0081411 | A1 | 4/2010 | Montenero | |
| 2010/0284674 | A1 | 11/2010 | Hanuska et al. | |
| 2012/0130632 | A1 | 5/2012 | Bandyopadhyay et al. | |
| 2013/0053063 | A1 | 2/2013 | McSheffrey | |
| 2013/0166195 | A1 | 6/2013 | Bandyopadhyay et al. | |
| 2013/0166198 | A1 | 6/2013 | Funk et al. | |
| 2013/0166202 | A1 | 6/2013 | Bandyopadhyay et al. | |
| 2013/0311133 | A1 | 11/2013 | Kordari et al. | |
| 2013/0311134 | A1 | 11/2013 | Kordari et al. | |
| 2013/0331121 | A1 | 12/2013 | Bandyopadhyay et al. | |
| 2013/0332064 | A1 | 12/2013 | Funk et al. | |
| 2013/0332065 | A1 | 12/2013 | Hakim et al. | |
| 2013/0332098 | A1 | 12/2013 | Funk et al. | |
| 2013/0332106 | A1* | 12/2013 | Karvounis | ................ G01C 5/00 |
| | | | | 702/141 |
| 2014/0278060 | A1 | 9/2014 | Kordari et al. | |
| 2014/0278080 | A1 | 9/2014 | Funk et al. | |
| 2015/0019124 | A1 | 1/2015 | Bandyopadhyay et al. | |
| 2015/0285636 | A1 | 10/2015 | Funk et al. | |
| 2015/0285638 | A1 | 10/2015 | Funk et al. | |
| 2015/0354965 | A1 | 12/2015 | Bandyopadhyay et al. | |
| 2016/0003625 | A1* | 1/2016 | Haverinen | ........... G01C 21/206 |
| | | | | 701/525 |
| 2016/0112854 | A1 | 4/2016 | Goossen | |
| 2016/0169670 | A1 | 6/2016 | Karvounis et al. | |
| 2016/0195391 | A1 | 7/2016 | Young et al. | |
| 2016/0195400 | A1 | 7/2016 | Young et al. | |
| 2016/0216117 | A9 | 7/2016 | Bandyopadhyay et al. | |
| 2016/0231121 | A1 | 8/2016 | Young et al. | |

OTHER PUBLICATIONS

Sterling, Greg. "Magnetic Positioning, The Arrival of 'Indoor GPS'." Online Report. Jun. 2014. pp. 1-11. Opus Research, Inc., San Francisco, California.

European Patent Office, Extended European Search Report from corresponding EP Patent Application No. 17892183.9, dated Oct. 18, 2019.

Australian Patent Office, Examination Report No. 1 from corresponding AU Patent Application No. 2017395024, dated Dec. 24, 2019.

Japanese Patent Office, Office Action from corresponding JP Application No. 2019-559264, dated Mar. 25, 2020.

European Patent Office, Communication Pursuant to Article 94(3) EPC from corresponding EP Patent Application No. 17892183.9, dated Sep. 10, 2020.

* cited by examiner

TRACKING AND ACCOUNTABILITY DEVICE AND SYSTEM

BACKGROUND OF THE INVENTION

Field of the Invention

The present invention relates to a tracking and accountability device and system, and particular to a system for communicating between individuals within and beyond a predetermined range, and for aiding in the safety of emergency responders.

Description of Related Art

A reliable tracking and communication system is essential for collecting and disseminating information at the scene of an emergency and for directing and controlling personnel and resources at the emergency. Additionally, first responders must have a system in place to enable communication among those on the scene to provide efficient and effective services to those in need of help. Currently, first responder departments have communication and accountability guidelines in place to facilitate communication and safety. For example, to provide tracking an inventory of first responders at the scene of an emergency, the accountability officer typically maintains the position and function of first responding individuals. At the scene of a fire, for example, the accountability officer typically collects the firefighter accountability tags from each firefighter about to enter a burning building. The tags are placed on the accountability tag board under the section corresponding with the firefighter's assigned position. The accountability officer will also record the names of each firefighter on an accountability board. Throughout the duration of the emergency, the accountability officer remains in radio communication with the firefighters, listens to each individual's position, and records the position of each during ground operations. This requires the firefighters to update their location at least every 5-10 minutes and for the accountability officer to carefully, and without interruption, listen to the radio updates provided by the firefighters. Upon the return of a firefighter to the accountability officer, the firefighter removes his or her tag from the accountability tag board indicating that the individual firefighter is no longer in the building.

A problem with this system is that it requires first responders to provide the necessary data, which can be very difficult to provide in many situations. In addition, it can be difficult to obtain positions of each firefighter by listening to voice communications. Further, the accountability officer is not able to detect whether a first responder is in peril without voice communication.

Traditional methods to track emergency responders typically rely on inertial navigation system comprising gyroscopes and/or accelerometers. While these types of sensors permit navigation in an isolated environment without any inputs from any other aiding sensors, error sources can accumulate over time. The gyroscope measurements drift over time and result in inaccurate measurements. Moreover, the gyroscopes and accelerometers have biases and nonlinearity errors that cause errors in estimations. Additional errors, such as computational errors, can accumulate during mathematical integration. Other systems rely on global positioning systems (GPS), which are typically more accurate over the gyroscope and accelerometer as the GPS does not drift. However, GPS has a slow update rate and can be less accurate in the short term than inertial navigation systems using gyroscopes and accelerometers. Further, once the individual enters the building or if the individual is in urban canyons of tall buildings, or in other challenging environments, physical barriers and interference sources may prevent the GPS signals from reaching the device or satellite.

BRIEF SUMMARY OF THE INVENTION

The present disclosure provides a communication system having a command unit, a processing unit, and a plurality of personal tracking units.

In one configuration, a communication system is provided comprising a command unit coupled to a wireless ad hoc network (WANET), a processing unit coupled to the WANET, a first personal tracking unit having a first mobile transceiver in communication with the wireless ad hoc network WANET, the first personal tracking unit coupled to a first set of user identification data of a first individual and being operative to transmit signals representing the first individual's location over the WANET to the processing unit, and a second personal tracking unit having a second mobile transceiver, the second personal tracking unit coupled to a second set of user identification data of a second individual and being operative to transmit signals representing the second individual's location (i) to the processing unit over the WANET if the second personal tracking unit is within a first distance; and (ii) to the first personal tracking unit if the second personal tracking unit is within the first distance to the first personal tracking unit.

Also provided is a communication system comprising a command unit coupled to a WANET, a processing unit coupled to the WANET, a first personal tracking unit having a first mobile transceiver in communication with the WANET, the first personal tracking unit coupled to a first set of user identification data of a first individual and being operative to transmit signals representing the first individual's location over the WANET to the processing unit, and a second personal tracking unit having a second mobile transceiver, the second personal tracking unit coupled to a second set of user identification data of a second individual and being operative to transmit signals representing the second individual's location (i) to the processing unit over the WANET if the second personal tracking unit is within a first distance; and (ii) to the first personal tracking unit if the second personal tracking unit is within the first distance to the first personal tracking unit, wherein each personal tracking unit further comprises a processor, an ambient temperature sensor for generating ambient temperature data, and a display, wherein the processor couples the ambient temperature data with the location data to generate a heat map of the location of the individual to be displayed on the display.

In a further configuration, a communication system is provided comprising a command unit coupled to a WANET, a processing unit coupled to the WANET, a first personal tracking unit having a first mobile transceiver in communication with the WANET, the first personal tracking unit coupled to a first set of user identification data of a first individual and being operative to transmit signals representing the first individual's location over the WANET to the processing unit, and a second personal tracking unit having a second mobile transceiver, the second personal tracking unit coupled to a second set of user identification data of a second individual and being operative to transmit signals representing the second individual's location (i) to the processing unit over the WANET if the second personal tracking unit is within a first distance; and (ii) to the first personal tracking unit if the second personal tracking unit is within the first distance to the first personal tracking unit, wherein the processing unit couples a plurality of location data points received from the personal tracking units with a preexisting structure map to generate a map having the locations of each personal tracking unit.

In another configuration, a communication system is provided comprising a command unit coupled to a WANET, a processing unit coupled to the WANET, a first personal tracking unit having a first mobile transceiver in communication with the WANET, the first personal tracking unit coupled to a first set of user identification data of a first individual and being operative to transmit signals representing the first individual's location over the WANET to the processing unit, and a second personal tracking unit having a second mobile transceiver, the second personal tracking unit coupled to a second set of user identification data of a second individual and being operative to transmit signals representing the second individual's location (i) to the processing unit over the WANET if the second personal tracking unit is within a first distance; and (ii) to the first personal tracking unit if the second personal tracking unit is within the first distance to the first personal tracking unit, wherein the personal tracking unit receives from the processing unit an egress map by a reverse data push of the locations of the individual.

In a further configuration, a device for determining the environmental conditions in an enclosed space is provided comprising a housing having a sensor module for collecting a plurality of data points, wherein at least one set of data points is one of an ambient temperature and a concentration of gas inside the enclosed space, and a transmitter coupled to a WANET for sending the plurality of data points to a processing unit over the WANET.

In yet another configuration, a method of generating a heat map of a structure is provided comprising the steps of receiving from a plurality of personal tracking unit time-stamped data packets comprising ambient temperature data and location data of a structure; combining the ambient temperature and location data with a map of the structure to provide a heat map; transmitting the heat map to a command unit; and displaying the heat map on a display of the portable computer.

The method may further comprise determining whether the temperature of the structure is above a structure heat tolerance; and sending an alert to at least one of a command unit and a personal tracking unit if the temperature is above the structure heat tolerance.

In yet another configuration, a method of determining a location of an individual in a building is provided. The method comprises coupling a first personal tracking unit (PTU) having a unique identification number to a first set of user identification data of a first individual stored on a separate device; transmitted the unique identification number of the first PTU and the first set of user identification data of a first individual to a processing unit; performing location measurements by at least one of an IMU and a radio location sensor located in the first PTU; transmitting the location measures to the processing unit; determining a location estimate of the first individual based on the location measurements received by the processing unit; accessing a Earth's Magnetic Field (EMF) map; selecting a portion of an Earth's Magnetic Field (EMF) map based on the location estimate; performing EMF measurements by a positioning device located in the first PTU; comparing the EMF measurements to the selected portion of the EMF map; and determining the location of the individual.

The method may further include the step of displaying the determined location of the individual on at least one of a portable computer and a display on the first PTU.

BRIEF DESCRIPTION OF THE SEVERAL VIEWS OF THE DRAWING(S)

The foregoing features of this invention, as well as the invention itself, may be more fully understood from the following description of the drawings in which.

DETAILED DESCRIPTION OF THE INVENTION

At the outset, it should be appreciated that like drawing numbers on different drawing views identify identical structural elements of the invention. While the present invention is described with respect to what is presently considered to be the preferred embodiment, it is understood that the invention is not limited to the disclosed embodiment.

Furthermore, it is understood that the invention is not limited to the particular methodology, materials, and modifications described and as such may vary. It is also understood that the terminology used herein is for the purpose of describing particular elements only, and is not intended to limit the scope of the present invention, which is limited only by the appended claims.

A tracking and accountability device and system are disclosed. The device and system tracks the location of individuals in real-time, including, but not limited to, first responders at the scene of an emergency. The system also provides a multi-media situational data pass, including but not limited to a temperature visual overlay or heatmap, which may be displayed in three dimensions. In addition, the system provides an egress map for individuals attempting to exit a dangerous environment.

Figure 1:
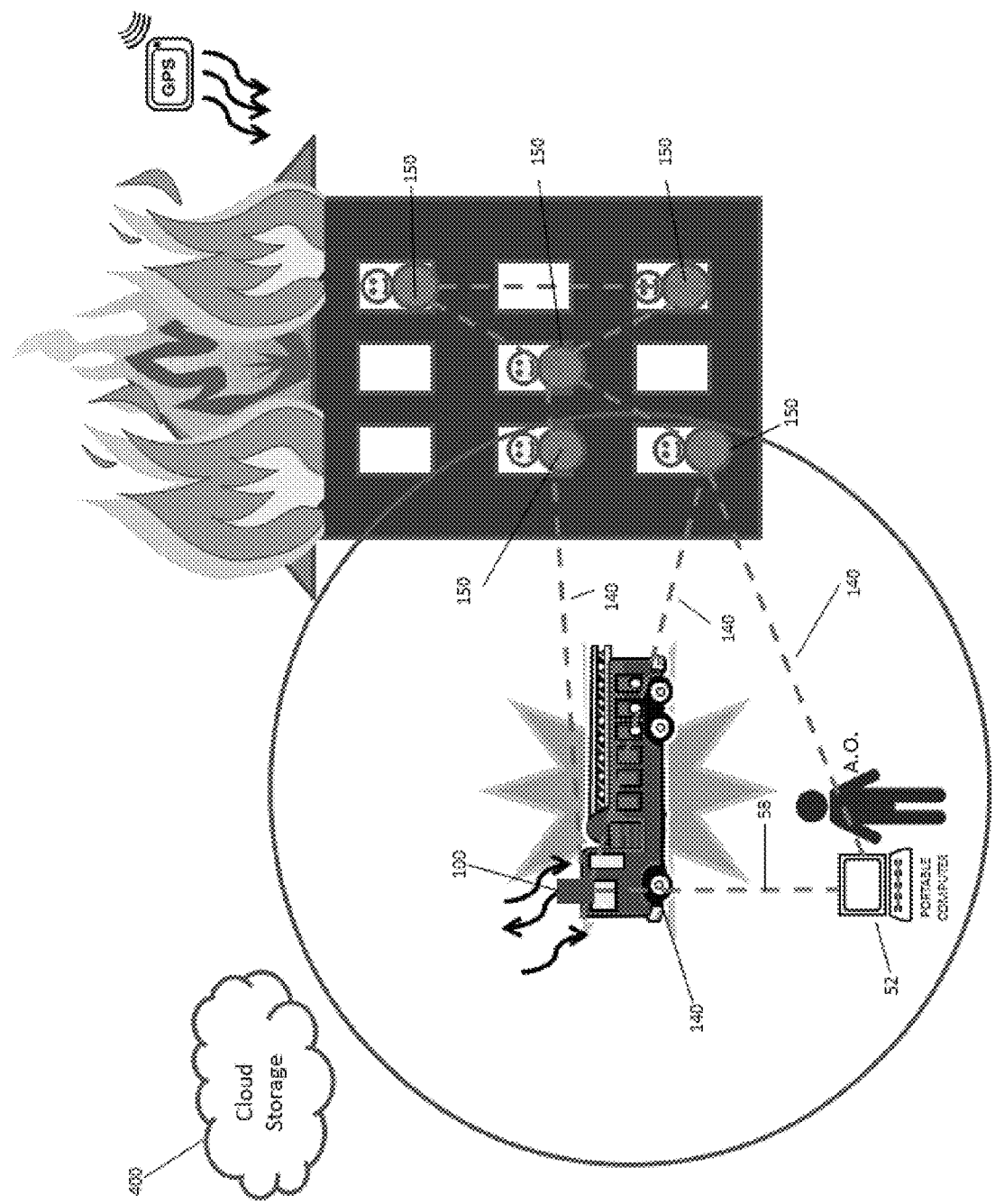
FIG. 1 is a schematic representation of the present system.
Figure 2:
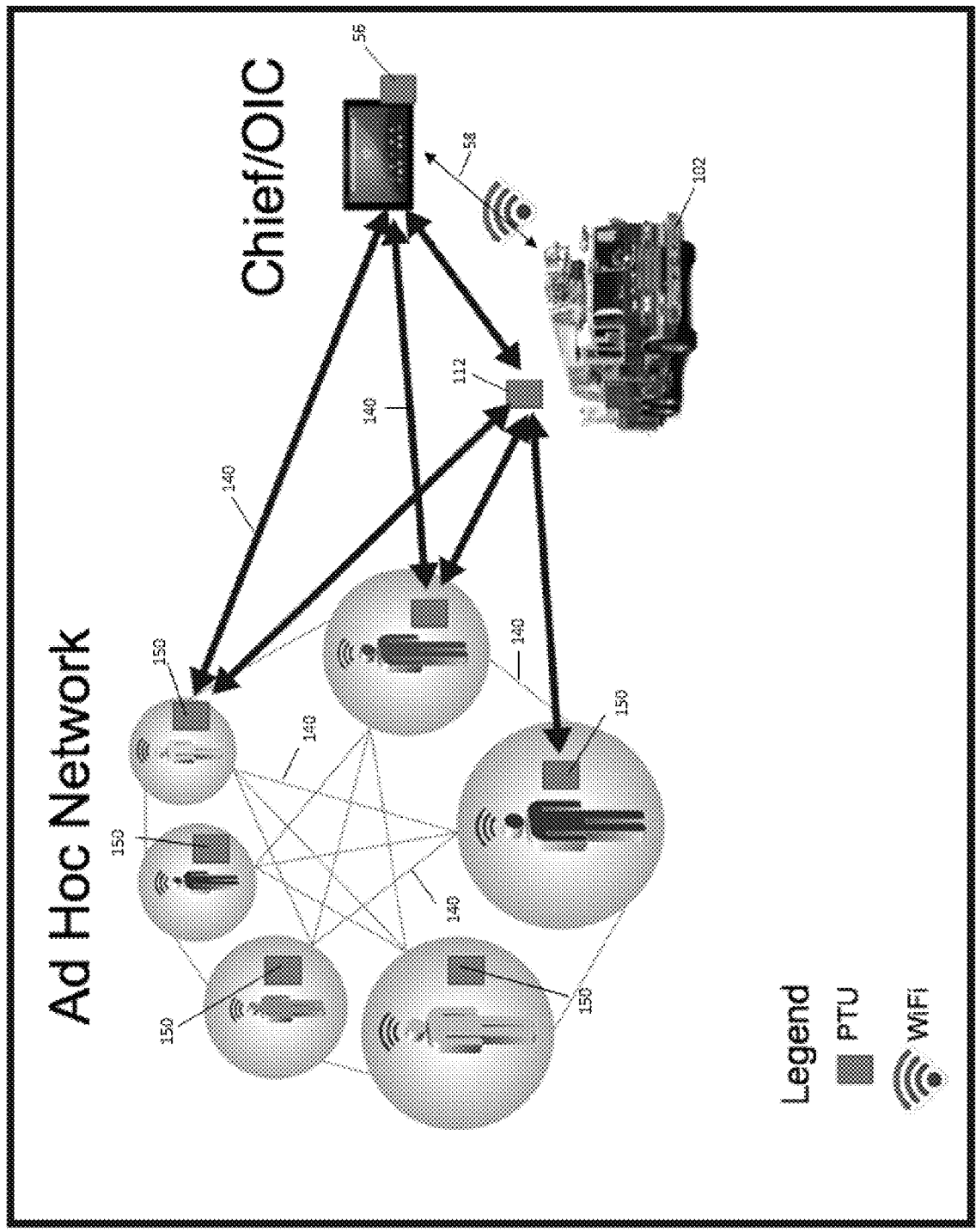
FIG. 2 is a schematic representation of the Wi-Fi communication network and the ad hoc communication network.
Figure 3A:
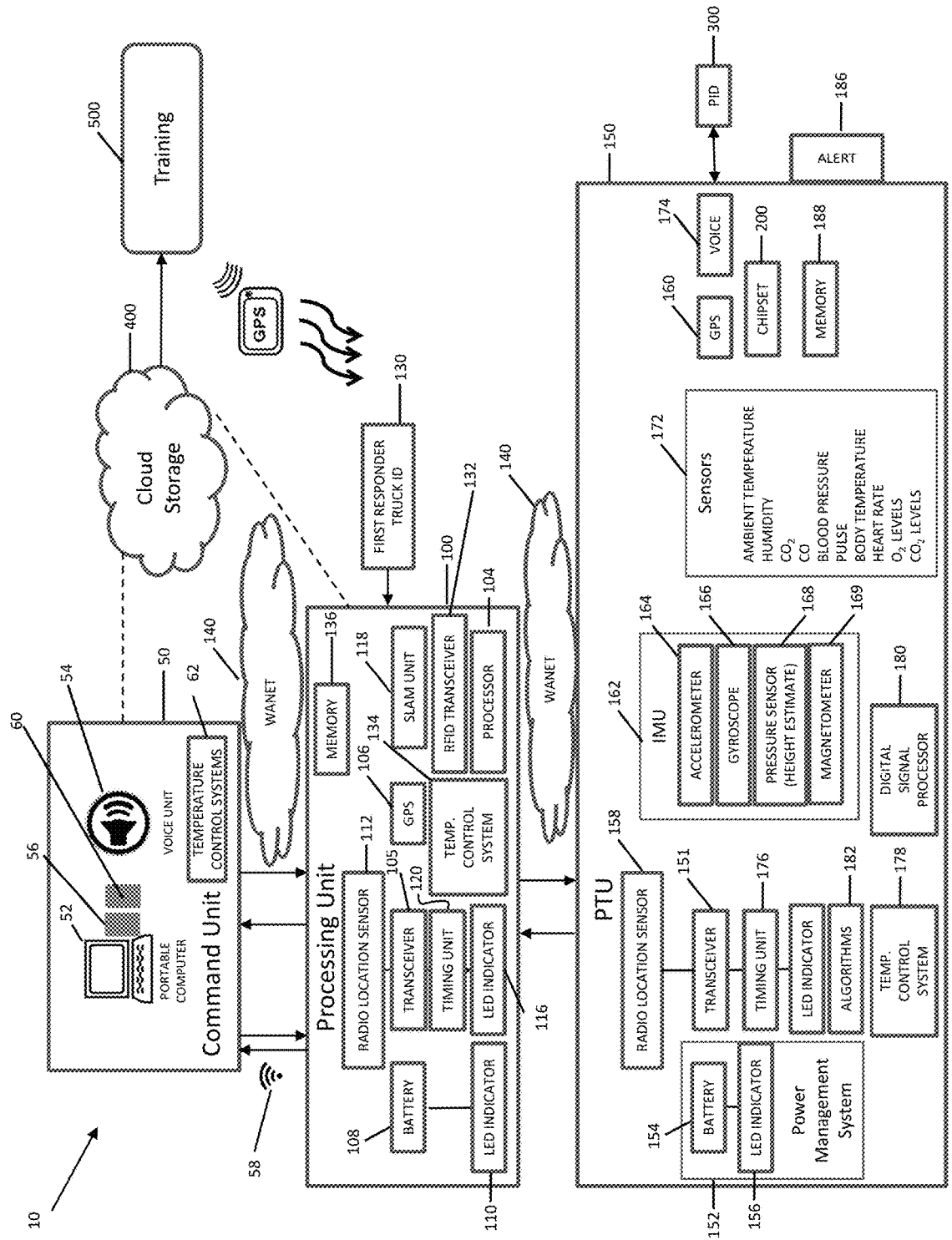
FIG. 3A is a schematic representation of the Command Unit, the Processing Unit and the Personal Tracking Unit (PTU).
Figure 3B:
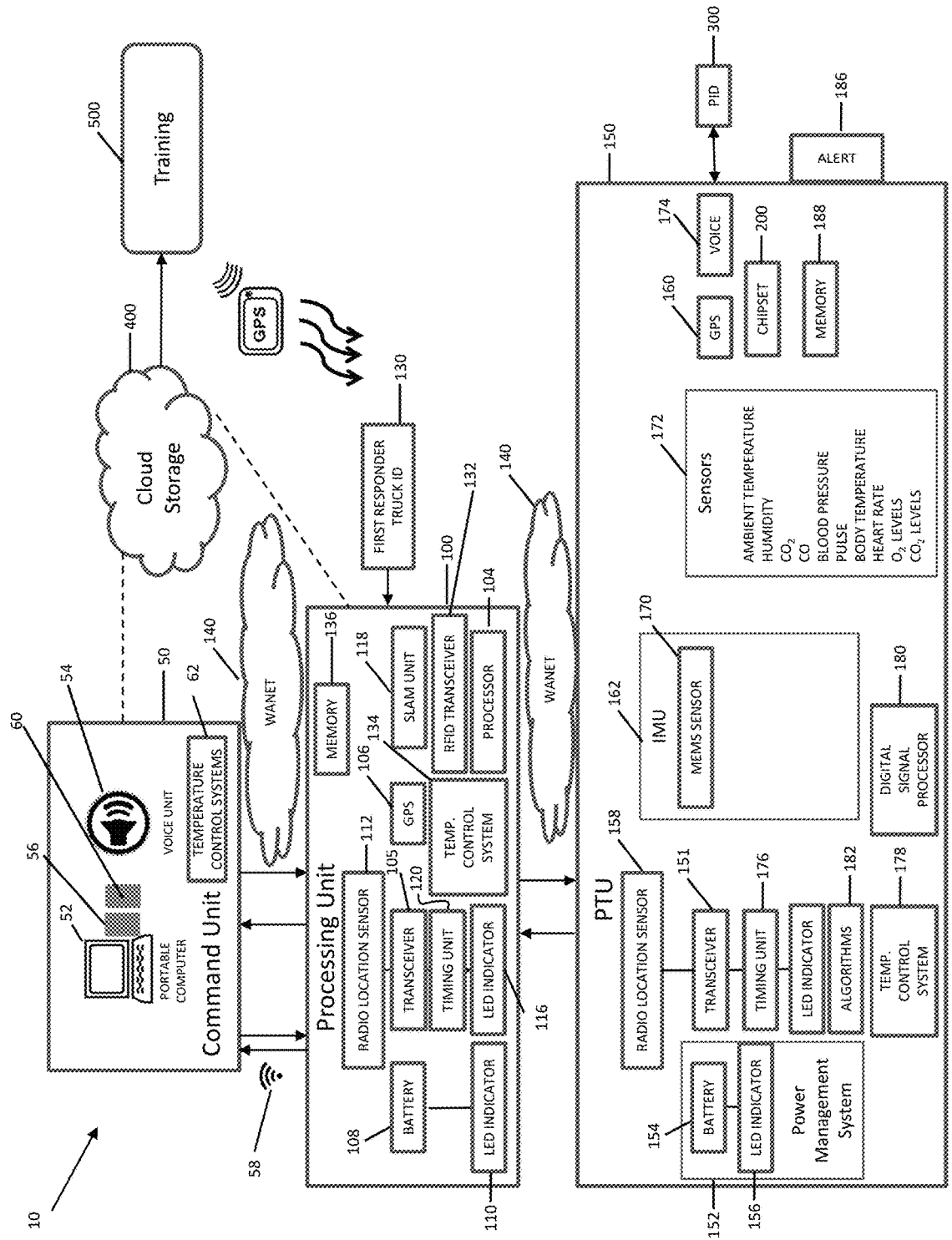
FIG. 3B is a schematic representation of an alternative configuration of the Command Unit, the Processing Unit and the Personal Tracking Unit (PTU).

Referring to FIGS. 1-3 the present system 10 includes a command unit 50, a processing unit 100, personal tracking units (PTUs) 150, and personal identification devices 300.

The command unit 50 includes a portable computer 52, for example a tablet, laptop, or similar portable computing device, in communication over wireless networks with the processing unit 100 and the PTUs 150. It is contemplated that there are two wireless communication networks, such as the standard Wi-Fi wireless communication network 58 between the processing unit 100 and the command unit 50 and an ad hoc network 140 between the PTUs 150, the processing unit 100, and the command unit 50. In one configuration, the command unit 50 is arranged to communicate with the processing unit 100 through two distinct methods of communication. First, the command unit 50 may communicate with the processing unit 100 via a standard Wi-Fi wireless communication network 58. Functional performance data may be transmitted between the processing unit 100 and the portable computer 52 over this Wi-Fi wireless communication network 58. The wireless communication network 58 is preferably a secure network. Secondly, the command processing unit 100 and 50 may each include a radio location sensor 56, 112, respectively, utilizing ultra-wideband wireless technologies that form an ad hoc network (WANET) as a wireless communication network 140 as described in more detail below. Location data may be transmitted over the wireless communication network 140 between the PTUs, processing unit 100, and command unit 50.

The portable computer 52 includes a computer program configured to provide the functional performance data and location data transmitted to the processing unit 100 by the PTUs 150 and processed by the processing unit 100 to an individual using the portable computer 52 through a graphical user interface (GUI). The command unit 50 may also include Global Positioning System (GPS) satellite receiver 60 to determine the location of the portable computer 52. In a configuration, the portable computer 52 includes the radio location sensor 56 and GPS satellite receiver 60. In yet another configuration, the individual using the portable computer 52 wears a PTU having the radio location sensor 56 and GPS satellite receiver 60.

In select configurations, the command unit 50 includes a voice unit 54 for communicating by voice, by any variety of commercially available voice enabling technologies that enable communication between individuals located at a spaced distance from each other. A satisfactory voice enabling technology includes, but is not limited to, Wireless Local Area Network (WLAN) and Voice over Internet Protocol (VOIP). Alternatively, or additionally, a radio can be used for communicating between individuals. A satisfactory radio includes the Vertex Standard VX-450 Series Portable Radio sold by Vertex Standard LMR, Inc.

The processing unit 100 is a server having a mother board coupled to at least some of the following standard components: memory, chipset, processor, standard hard drive controller, expansion slots, I/O ports, and network adaptor. The processing unit 100 further includes a power supply, as described below. The processing unit 100 may store the data received from the PTUs 150 and portable computer 52 in memory 136. In a configuration, this data may also, or alternatively, be stored on the cloud via remote servers 400 and utilized for training 500. Typically, the processing unit 100 will connect with the remote servers 400 over an internet connection made when the processing unit 100 returns to the storage facility, for example, a fire engine vehicle returning to its fire station. The processing unit 100 may connect to the servers 400 through a wired connection, wireless connection, or hybrid wired-wireless connection. The stored data may be converted into a form that is acceptable for use by regulatory agencies, such as NFPA, OSHA, DHS, and/or FEMA. The processing unit 100 comprises a radio location sensor 112, such as the DecaWave ScenSor DW1000 chip described in more detail below for communication between the portable computer 52 and the PTUs 150 over the WANET 140.

The processing unit 100 further comprises a processor 104. The system 10 can potentially utilize any number of commercially available processors, however, the onboard processor must be fast enough to calculate the algorithms described herein in real-time. Preferably, a multi core processor is used. One example of a multicore processor that may be used is the Quad Core™ Intel® Atom™ Platform sold by Intel Corporation of Santa Clara, Calif. In one configuration, the processor 104 is arranged to communicate with as many PTU data streams that can pass through a single point PTU between the processor 104 and the remaining PTUs. Current technology provides that the processor 104 communicates with approximately seventy-five (75) PTUs 150. If additional connections are present between the processing unit 100 and the PTUs 150 then the limit would be increased. For example, if three separate connections were present between the processing unit 100 and the PTUs 150, the limit under current technology would be 225 PTUs. Persons skilled in the relevant art will be aware that the complexity of the SLAM algorithm will increase exponentially with a system having a greater number of PTUs. Therefore, using a more powerful processor will allow additional PTUs to be used with the system 10. For example, an Intel® Xeon™ processor may permit up to 500 PTUs to be added to the system 10. Additionally, if the algorithms of the Processing Unit 100 become more demanding, a GPU can be added to the system to increase computational abilities of the Processing Unit 100.

Notwithstanding the foregoing, the minimum number needed for three-dimensional localization of the PTUs 150 is three (3) PTUs and one (1) processing unit 100, provided however, that any two (2) of the four (4) PTUs are not in a virtual plane. The position estimates may be more accurate with an increase in the number of PTUs 150. In the event the number of PTUs 150 required at the scene of an emergency exceeds the processor's limit of PTUs, the system 10 may require additional processors. Additional processing units would communicate with the command unit 50 in the same manner as the first processing unit 100. In one configuration, the processing unit 100 is mounted on the first responder vehicle 102, for example, a firetruck, and is associated with a set of PTUs. The processing unit 100 further includes a GPS satellite receiver 106. In an alternative configuration, the GPS satellite receiver is worn by an individual utilizing the portable computer 52. In such a configuration, the processing unit 100 mounted to an emergency vehicle 102 obtains its power supply from such vehicle 102. The processing unit 100 may alternatively, or in addition, include a battery 108 coupled to an LED indicator light 110, the battery 108 is capable of being charged by shore power when the first responder vehicle 102 is parked at a station. The processing unit 100 may also be charged via the first responder vehicle battery. As discussed below, an indicator 116, such as an LED indicator light indicates whether the processing unit 100 is in communication with a PTU device 150 and/or the command unit 50 over the wireless communication network 58 and/or the wireless communication network 140.

Turning now to the Personal Tracking Unit (PTU) 150, each PTU 150 includes a power management system 152 measuring the remaining charge of a battery 154. An indicator 156, such as an LED indicator light, may be coupled to the battery 154 to indicate when power is available to the PTU 150, when power is low, and/or a particular level of the battery charge. The LED indicator light 156 may be a first color, for example, green, when the battery is fully charged, and change to a second color, for example, orange, when the battery is low. The batteries 154 of the PTUs 150 can be charged simultaneously using a bank charger known in the art (not shown) on the first responder vehicle 102. In one configuration, the bank charger is a 120V charger capable of charging at least six (6) PTUs 150 located and wired directly into the cab of a first responder vehicle 102 and supported by shore power. The PTUs 150 can therefore, be charged in a temperature controlled environment simultaneously with other elements on the first responder vehicle 102. The bank charger may also comprise the first responder vehicle identifying information 130 and the primary source of the wireless communication network 58.

In one configuration, the wireless communication network 140 includes a radio location sensor 158 coupled to the PTUs, a radio location sensor 112 coupled to the processing unit 100, and a radio location sensor 56 coupled to portable computer 52. This wireless communication network 140, in one configuration, is a wireless ad hoc network (WANET). Each radio location sensor participates in routing by forwarding data from the other radio location sensors. Thus, there is a dynamic determination of which radio location sensor will forward data to the next radio location sensor based on network connectivity. The wireless communication network 140 may operate under separate frequencies for communicating with the PTUs 150 and for communicating with the portable computer 52. In one configuration, under normal operating conditions, the WANET 140 utilizes 5 Hz-10 GHz broadcasting on every frequency in this range, simultaneously. Preferably, the WANET provides PTU mobility and low overhead of both channel bandwidth and battery power of the PTUs for communicating and processing. A well-known Ad Hoc On Demand multiple path distance vector (AOMDV) may be used to provide reactive routing for the WANET 140.

In one configuration, the radio location sensors 56, 112, 158 are ScenSor DW1000 chips, which use an IEE802.15.4-2011 UWB compliant wireless transceiver module to communicate and are commercially available from decaWave located at Adelaide Chambers, Peter Street, Dublin 8, Ireland. The DW1000 chips utilize ultra-wideband wireless techniques which helps reduce the effect of multipath propagation. The DW1000 chip can be used for radio communication as well. In one configuration, this wireless communication network 140 using the DW1000 chip can communicate at a range of up to 300 meters and transfer data at approximately 6.8 Mbps data rate.

The network 140 uses an ultra-wideband wireless communication technique based in the IEEE802.15.4-2011 standard and gives the system 10 immunity against multipath fading. The DW1000 chip dimensions are small, 6 mm×6 mm, and requires a very low amount of power: only 31 mA during transmission and 64 mA during reception. The DW1000 chips operate in a network and as a result, if communication between a PTU 150 and the processing unit 100 fails because the PTU 150 is out of range, then the communications are relayed to another PTU in the vicinity of the first responder vehicle 102 having a processing unit 100 and PTU 150, and that PTU will communicate with the processing unit 100. It is contemplated that the portable computer 52 will display to the portable computer user, such as the accountability officer, the distances between each PTU 150, with an accuracy this is approximately within one (1) foot. Moreover, the portable computer 52 will display and identify the individual closest to another individual wearing a PTU, considering the x, y, and z-axis, using appropriate entrances, exits, and stairs, and without permeating floors.

The PTU 150 further includes a GPS satellite receiver 160. The GPS satellite receiver 160 can be used to receive position and velocity with the GPS in most all weather conditions and in most all places on or near Earth. A GPS satellite receiver that may be used with the processing unit 100 as GPS satellite receiver 106 and with the command unit as GPS satellite receiver 60 is a commercially available GPS system from Telit located at 90 High Holborn, London WC1V 6XX, UK. When an individual is outside of a structure, the position may be determined by the GPS satellite receiver 60, 106, 160 including the initial position of the individual. Global Navigation Satellite Systems (GNSS) may not always be available or reliable. In these situations, data from other sensors of the PTU 150 can be fused to provide positioning information that is refined even when the GPS is unavailable, as described in more detail below.

In a configuration, the PTU 150 comprises a digital signal processor 180. One example of a digital signal processor 180 that may be used is the OMAP L-138 DSP processor commercially available from Texas Instruments, located at 12500 TI Boulevard, Dallas, Tex. 75243. The digital signal processor 180 of each PTU is responsible for processing the data collected by such PTU. For example, the digital signal processor 180 may process the data collected by the PTU with the well-known inertial navigation algorithm, posture detection algorithm, and step detection algorithm, among others, as discussed in more detail below.

The PTU 150 further comprises an inertial measurement unit (IMU) 162 providing an inertial navigation system for determining the relative position, velocity and/or altitude of the individual wearing the PTU 150. The IMU 162 may include an accelerometer (linear motion sensor) 164, gyroscope (angular velocity sensor) 166, a pressure sensor (height estimator) 168, and a magnetometer 169. In another configuration, the IMU 162 is a Microelectromechanical Systems (MEMS) sensor 170, which is an accelerometer, gyroscope, and pressure sensor. In one configuration, the PTU 150 includes an IMU 162 having three orthogonal rate gyroscopes and three orthogonal accelerometers. The accelerometer 164 or the accelerometer of the MEMS sensor 170 measures the linear acceleration of the PTU 150 in the inertial reference frame (a fictitious or virtual frame of reference), but in directions that can only be measured relative to the moving PTU 150. The gyroscope 166 or gyroscope of the MEMS sensor 170 provides angular rates, which can be integrated to determine the orientation of the PTU 150. The orientation of an individual wearing the PTU 150 can be determined by a sudden change in velocity of the individual as detected by the gyroscope 166 or the gyroscope of the MEMS sensor 170, which could indicate the individual has fallen or struck the ground very hard.

The measurements from the accelerometer 164 and gyroscope 166 or MEMS sensor 170 allow the system 10 to determine the position and orientation of the PTU 150 and therefore the position of the individual relative to their initial position obtained from the GPS 160. The data from the IMU 162 is processed by the digital signal processor 180 wherein certain algorithms 182 are applied to the data collected by the IMU 162. For example, the data from the accelerometer 164 and gyroscope 166, or from the MEMS sensor 170, of the PTU 150 is applied to the inertial navigation algorithm by the digital signal processor 180 to continuously calculate floor position of the individual via dead reckoning. Thus, the relative position, orientation, and velocity of the moving individual are determined without the need for external references. The position estimate via the PTU 150 is relative to the initial position estimate from the GPS 160 of the PTU 150 or the GPS 106 of the processing unit 106 or the GPS 60 of the command unit 50.

In one configuration, the gyroscope 166 has an accuracy of +/-1 degree and an angle of less than 45 degrees is considered to be horizontal and above 45 degrees is considered to be vertical. The default floor height is typically 10 feet, however, this can be adjusted by the OIC using the computer program on the portable computer 52. The angular rates measured by the gyroscope 166 or the gyroscope of the MEMS sensor 170 may also serve as the basis of the step detection algorithm, which may be used to correct the drift of the inertial navigation system. The pressure sensors 168 measure atmospheric pressure, which may be used to predict the altitude of the firefighter from the ground level and may aid the inertial navigation system to correct the drift in the navigation algorithm.

The accelerometer 164 and gyroscope 166 or MEMS sensor 170 data, however, do not allow accurate autonomous location without external updates, for example from GPS signals, since the sensor signals 164, 166 or 170 are affected by various noises and drifts. Since the position and velocity of the individual are updated based on calculations using the initial position and orientation either initialized by another sensor, such as the GPS satellite receiver 160, or entered by a human operator, the starting position is extremely important since all future estimates of position will be calculated relative to the initial position. To compensate for any errors that may result, external aid, via sensor fusion, is integrated into the inertial navigation system, as discussed below.

Figure 4:
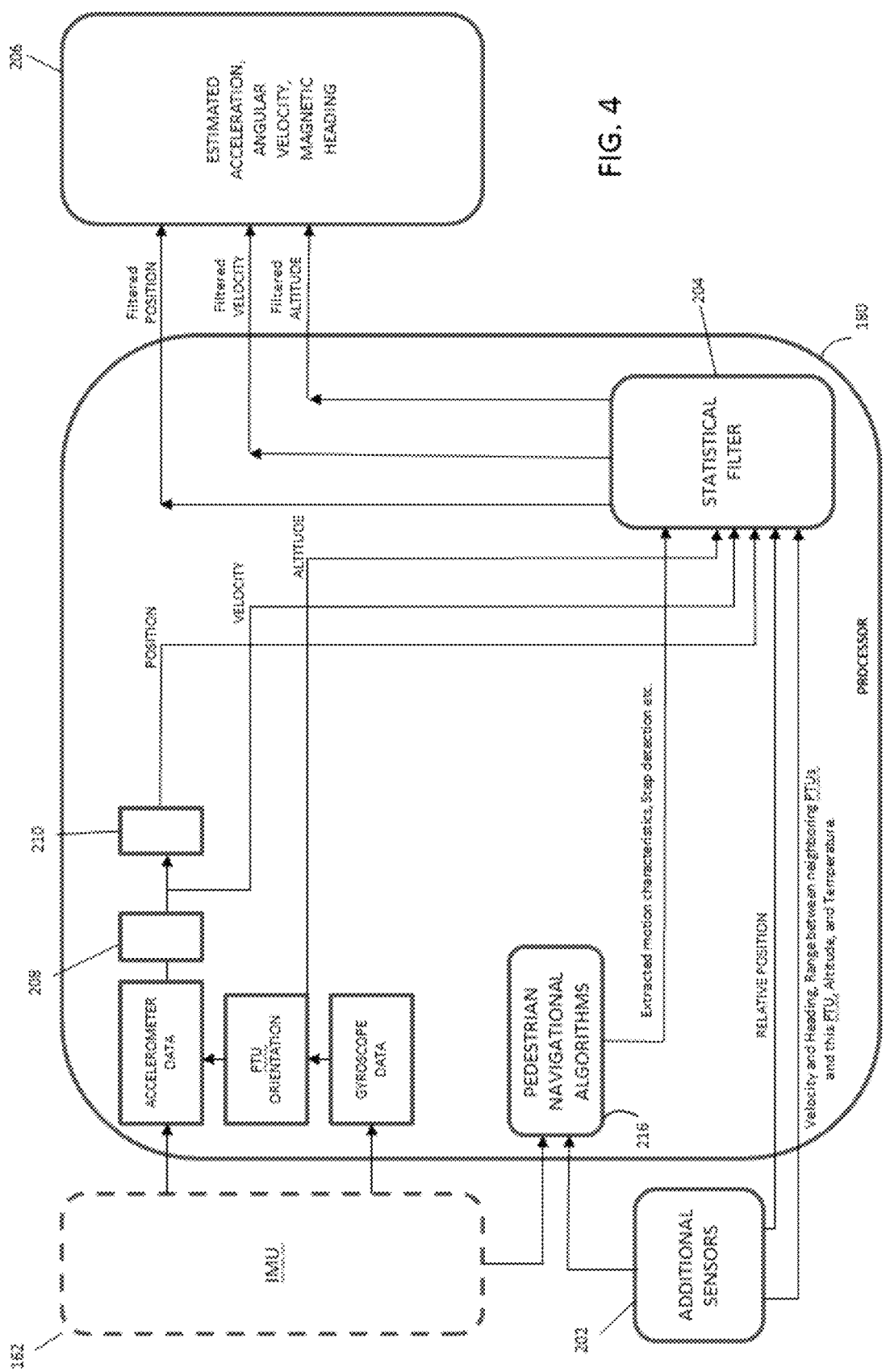
FIG. 4 is a block diagram of the process for providing the estimated acceleration, velocity and altitude based on data from the IMU and the additional sensors.

FIG. 4 is a block diagram showing that data from the IMU 162, for example from the accelerometer 164, gyroscope 166, or alternatively, from the MEMS sensor 170, is processed by digital signal processor 180 with numerical integrations 208, 210. The resulting position, velocity and altitude determinations may be fed to a statistical filter 204, such as the Extended Kalman filter or the Particle filter. In some configurations, the well-known inertial navigation algorithm and other well-known algorithms, such as the magnetic heading estimation of the first responder are applied. As shown in FIG. 4, data from the additional sensors 202 is processed by the processor 180 to provide at least some of a relative position, velocity and heading, range between neighboring PTUs, altitude, and temperature, which is fed to the statistical filter 204. The input from the IMU 162 and the additional sensors 202 may also be processed by the processor 180 using the well-known pedestrian navigational algorithms 216 to provide at least the extracted motion characteristics and the step detection, which are fed into statistical filters 204. The additional sensors 202 may include, for example, any of the following: the radio location sensor (DW1000) 158, pressure sensor 168, magnetometer 169, and temperature sensor 172. However, it should be appreciated that other sensors may also or alternatively be used. These complex navigational algorithm calculations provide information that is useful and accurate, even if one or more of the sensors are noisy, has a slow update rate, or even when the data has stopped coming from the sensor altogether. In this manner, a filtered position, velocity and altitude provide an estimate 206 of the acceleration, angular velocity, and magnetic heading of the individual wearing the PTU 150, which is generally drift free, without the need for GPS when the individual (and PTU 150) is inside a structure.

Figure 12:
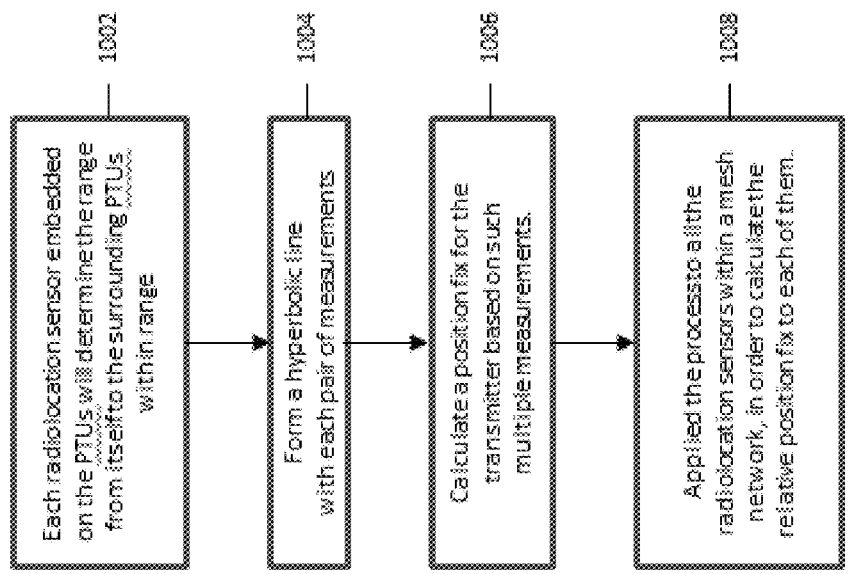
FIG. 12 is a flow chart disclosing the method steps of a configuration of the hyperbolic navigation process.

The DW1000 chip provides relative positioning of the PTUs 150 by enabling calculations of the mutual range of four or more chips. Thus, to provide 3D localization, at least three (3) PTUs and one (1) processing unit 100 will need to be utilized at the scene. Each DW1000 chip of a PTU within a network will know its own position relative to each DW1000 chip of its related PTU. Where there are no obstructions between DW1000 chips, the accuracy in an indoor environment is approximately 10 cm. Accuracy may decrease for Non Line Of Sight (NLOS) cases, however, this will depend on the materials and thickness of the wall blocking the signal. The radio location sensors 112, 158 are an aid to the inertial navigation system. Thus, the digital signal processor 180 will avoid using the DW1000 data if there is any sudden change in range estimation from the DW1000 sensors indicating that there is a sudden obstruction prohibiting correct range estimation. To localize a first responder with range measurements from the radio location sensor 112, hyperbolic navigation using the well-known hyperbolic navigation algorithms may be used. Hyperbolic navigation is provided by measuring the time difference of arrival (TDOA) of two signals from two PTUs. As set forth in FIG. 12, each radiolocation sensor 158 embedded on the PTUs will determine the range from itself to the surrounding PTUs within range according to step 1002. Then, each pair of measurements will form a hyperbolic line according to step 1004. As set forth in step 1006, a position fix will be calculated for the PTU using multiple measurements forming hyperbolic lines. According to step 1008, the process is applied to all the radiolocation sensors within a mesh network, in order to calculate the relative position fix for each.

The data from the IMU 162 may also be used to detect the posture of the individual. By posture, it is meant that it can be determined whether the individual is in a vertical or horizontal position, or falling. Posture detection can be determined by the digital signal processor 180 of the PTU 150 receiving the data from the accelerometer 164 and gyroscope 166 or MEMS sensor 170 and applying the well-known step detection algorithm and/or the posture detection algorithm. These computations may also be used to correct the drift in the inertial navigation system.

Figure 11:
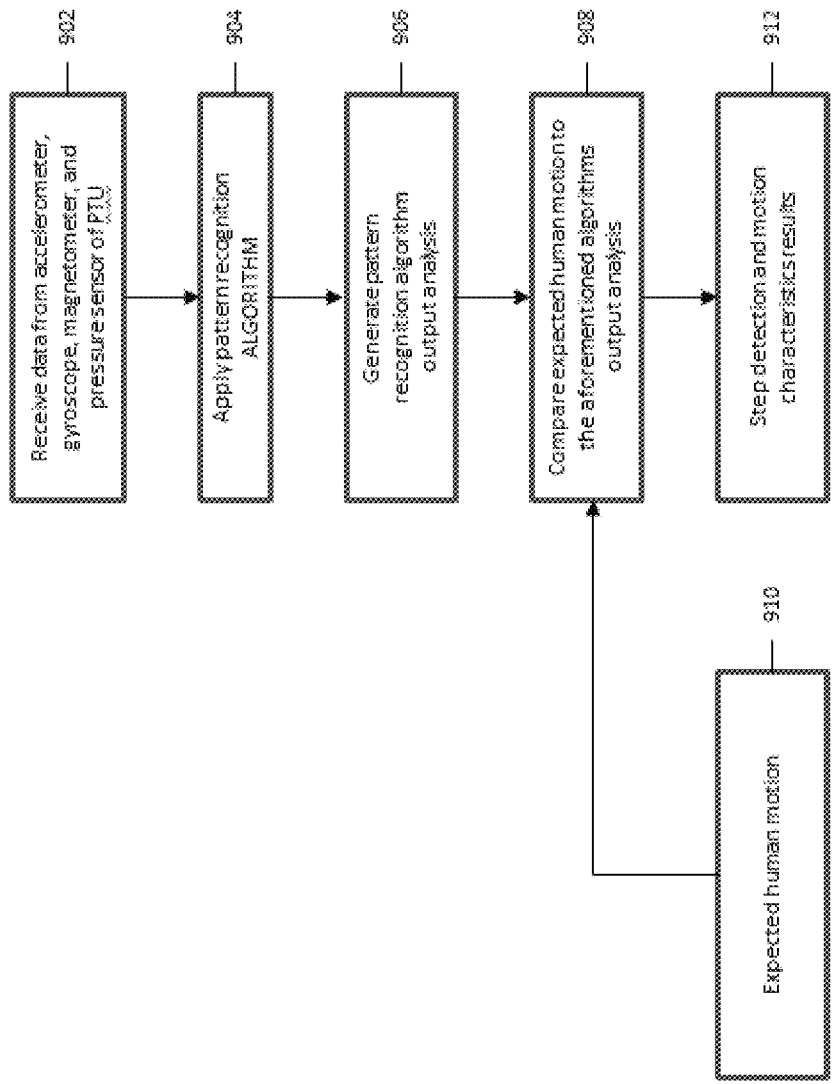
FIG. 11 is a flow chart disclosing the method steps of a configuration of the step detection and motion characteristics process.

The posture of an individual wearing the PTU 150 may also be determined using motion detection. The processed data from the IMU 162 cannot allow accurate autonomous location without external updates, for example from GPS signals, since their signals are affected by various noises and drifts. Thus, frequent GNSS updates can be used when available. When GNSS aiding is not available, other approaches may be used. For instance, the well-known Pedestrian Dead Reckoning (PDR) using embedded inertial sensors may be used. The accelerometer 164 or MEMS sensor 170 detects the number of steps, determines the step length, and transmits such data to the digital signal processor 180, wherein the PDR algorithm is applied and the travelled distance is computed. Given a known initial position, the PDR algorithm determines the individual's position by estimating the heading and the individual's travelled distance or the individual's speed. The digital signal processor 180 may also apply well known pattern recognition algorithms, such as neural network, to detect the posture of an individual wearing a PTU 150 as well as the individual's footsteps. As shown in FIG. 11, the pattern recognition algorithm may be applied. First, data is received from the accelerometer 164 and gyroscope 166 or MEMS sensor 170 according to step 902. In a configuration, data from the magnetometer 169 and pressure sensor 168 may also be used according to step 902. The pattern recognition algorithm is applied to such data according to step number 904. As set forth in step 906, pattern recognition algorithm output analysis is compared to expected human motion data 910 according to step 908, resulting in step detection and motion characteristics results according to step 912.

In yet another configuration, the processing unit 100 may include a Simultaneous Localization And Mapping (SLAM) unit 118 for determining the position and orientation of the individual. SLAM is a well-known computational process of constructing or updating a map of an unknown environment while simultaneously keeping track of an individual's location within it. As the individual proceeds into a structure, for example, the PTU 150 will collect the data from the accelerometers and gyroscopes or MEMS sensor 170 as well as other available sensors and transmit metadata to the SLAM unit 118 of the processing unit 100, including but not limited to any of the following: the position and orientation of the first responder, whether the first responder is standing or falling straight, the ambient temperature, body temperature, carbon dioxide level, carbon monoxide level, humidity, pressure, and flashover detection. The SLAM unit 118 will build a map of the surrounding environment. This map can be used in many cases, such as rescuing trapped firefighter, planning out a safe path through the debris, among others. The map is communicated to the portable computer 52 via the wireless communication network 58.

As shown in FIG. 3, the PTU 150 may further include additional sensors 172 that measure biometric data from the individual as well as ambient data. For example, the sensors may measure the blood pressure, pulse, heart rate, oxygen levels, carbon dioxide levels, and body temperature of an individual. Additionally, sensors may measure ambient conditions, including but not limited to, ambient temperature, humidity, concentration of cases such as carbon dioxide levels, carbon monoxide levels, hydrogen cyanide levels, phosgene levels, and oxygen levels, and ambient pressure. This data collected by the sensors 172 will be sent to the processing unit 100 (either directly if the PTU 150 is within a predetermined distance of the processing unit 100 or via another PTU within the predetermined distance of the processing unit 100) in the form of data packets. The data packets are time stamped and processed by the processor 104 of the processing unit 100. In one configuration, the ambient temperate data representing the temperature inside the structure in each area where a firefighter is present will be represented as a heat map overlay by the computer program available on the portable computer 52. The heat map illustrates the temperatures at various points throughout the building based on temperature data received from each PTU 150 in relation to the time. The heat map may be displayed as color changes and shading over a map display of the internal structure of the building. The heat map may also indicate the stability of certain areas of a building. The colors may be displayed with the temperature measurements in degrees Fahrenheit or Celsius pinned inside the image or within a legend. The heat map may also display other ambient information including, but not limited to gas levels, pressure and humidity.

Figure 5:
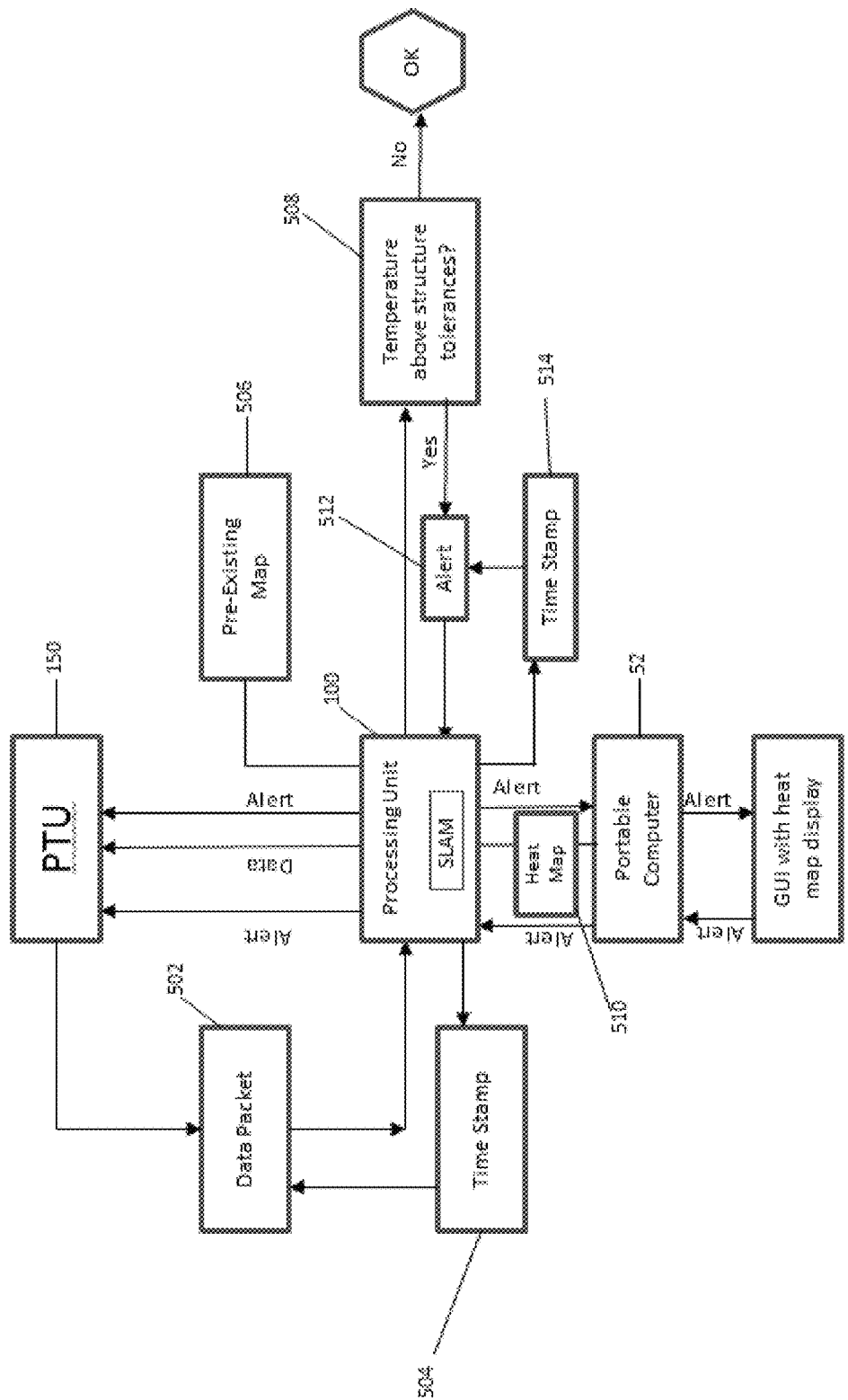
FIG. 5 is a flow chart disclosing the method steps of a configuration of the heat map display and alert system.

As shown in FIG. 5, the heat map 510 may be generated according to the following steps. First, each PTU 150 sends data packets 502 that are time-stamped 504 to the processing unit 100. As shown in FIG. 5, the processing unit 100 may provide the time-stamp 504 for the data packet 502. However, it should be appreciated by those having ordinary skill in the art that the time-stamp may be provided by the PTU 150 itself. The processing unit 100 will couple the ambient temperature and location data from the PTUs with a map of the structure to provide the heat map. In a configuration of the invention, the heat map 510 is generated as the output of the SLAM algorithm. The processing unit 100 will then transmit the heat map 510 to the portable computer 52 over the wireless communication network 58 wherein the map will be displayed on a GUI. In a configuration, the processing unit 100 also transmits the heat map 510 to the PTU 150. In a configuration, the heat map includes a preexisting map 506 that is pre-loaded into the system 10. In another configuration, a pre-loaded map is not used and the heat map is generated based on the location data received from the PTUs 150.

The processing unit 100 will compare the ambient temperature data to a set of structure heat tolerance data 508. If the ambient temperature is above the structure heat tolerance, the processing unit 100 will send an alert 512 to the portable computer 52 and/or the PTUs. The processing unit 100 will time stamp 514 the alert 512 and in a configuration, send the alert to the PTU 150 and/or the portable computer 52. The processing unit 100 may also determine if rapid changes in temperature are occurring. In the event of a fire, the processing unit will report whether the fires is at a growth stage, fully-developed stage, or declining state. The processing unit 100 may also indicate the occurrence of a flashover or backdraft. In the event the processing unit 100 determines a potential collapse of the structure based on temperature and time data, the processing unit 100 will send a collapse alert to the portable computer and/or any PTU within a predetermined range of the structure at risk of collapsing. In the event the building materials are known, the stability may be calculated based on the heat tolerances of such materials. For example, in 2014 there were 1.3 million fires in the U.S. and 74% were in residential family homes. The majority of these can be assumed to be wood truss construction, and thus, more than half of the fires in the US are in wood truss homes. A fire directly to the trusses (an attic fire) would collapse in approximately ten (10) minutes. If the fire started on the first floor of a wood truss home, it would take approximately 1-2 hours for the entire house to burn. Other burn time examples based on building construction can be found on the world wide web at https://dps.mn.gov/divisions/sfm/programs-services/Documents/Sprinkler%20Applications/ConstructionTypeDefinitions.pdf and at http://www.fireengineering.com/articles/print/volume-161/issue-5/departments/training-notebook/structural-collapse-under-fire-conditions.html.

Figure 6:
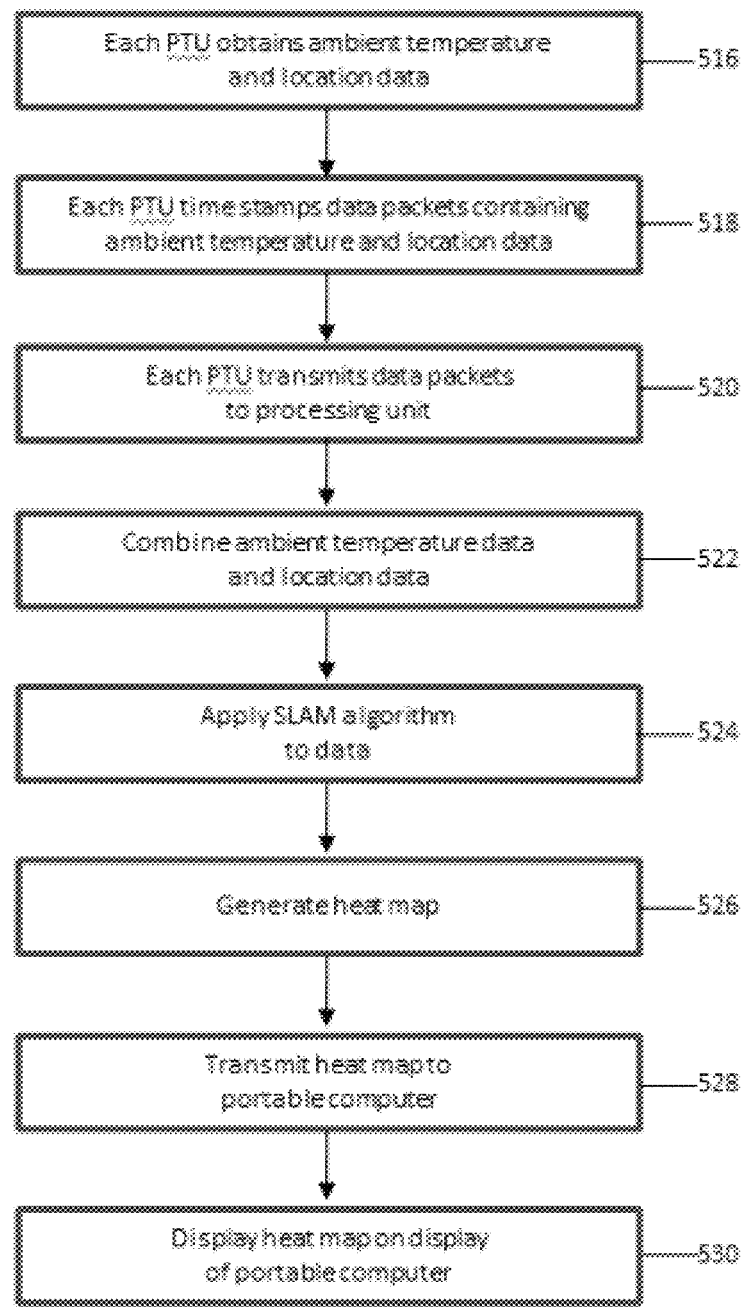
FIG. 6 is a flow chart disclosing the method steps of a configuration of the heat map generation system.

As shown in FIG. 6, the heat map 510 may be generated according to the following steps. First, a plurality of PTUs 150 obtain ambient temperature and location data 516. The PTUs 150 form data packets containing the ambient temperature and location data and provide a time-stamp 518. The data packets are transmitted to the processing unit 100 according to step 520 and then the processing unit 100 combines the ambient temperature data with the location data according to step 522. The processing unit 100 applies the SLAM algorithm according to step 524. The processing unit 100 generates a heat map according to step 526 which is then transmitted to portable computer 52 according to step 528. The heat map is displayed on the portable computer 52 according to step 530.

It should be appreciated that the processing of the ambient temperature and location data to generate a heat map may alternatively, or additionally be handled by each PTU processor 180 and this modification is intended to be included herein.

In one configuration, the ambient temperature sensor 172 of each PTU 150 measures the ambient temperature every $1/20^{th}$ of a second and measures a range up to 1200 degrees Fahrenheit within an accuracy of +/−5 degrees. Rapid temperature changes are also identified and may be reported to the user of the portable computer 52 as an alert. The heat map, or the temperature data used to build the heat map, may be transmitted from the processing unit 100 to the PTUs to communicate to the individuals wearing the PTUs the temperature of the surrounding area of the individual and/or the stability of the structure surrounding the individual. Alternatively, or additionally, ambient temperature data may be communicated between PTUs, thereby alerting a second individual of high temperatures or potential structural collapse based on the PTU data from the first individual. In cases of fire, the firefighters are typically in fire protective gear that is rated to a predetermined temperature. For example, in full gear, the fire protective gear may protect an individual at a maximum temperature of 500 degrees Fahrenheit for 5 minutes. Thus, in one configuration the user of the portable computer 52 may be alerted if an individual is exposed to the maximum temperature for longer periods and/or at hotter temperatures.

It should be appreciated by those having ordinary skill that the PTU 150 may take many shapes and forms. For example, the PTU 150 may include a wrist-mounted device that shows relevant information, such as temperature data, structural stability, the individual's biometrics and/or an egress map as discussed in more detail below. It is contemplated that alerts that are sent by the processing unit 100 to the user of the portable computer 52 are time stamped and recorded in memory 136 along with the corrective action taken. This data can be analyzed later for training 500.

The following steps may be followed when the system is in use for responding to a fire. First, a first responder vehicle 102, for example a fire truck, is unplugged from the shore power connection, which activates the locator device on processing unit 100 positioned on the first responder vehicle. The processing unit 100 is automatically recognized by the wireless communication network 58. The drivers of the first responder vehicles will place the first responder vehicles around the scene of the emergency based on the location of the incident and the function of the first responder vehicle. Each first responder vehicle may have a processing unit 102 that reports the vehicle's position to the command unit 50, which can be accessed by user of the portable computer 52, for example, the Officer in Charge (OIC) or other personnel. In one configuration, the processing unit 100 is included in the bank charger.

Once the first responder vehicle 102 is in position, the OIC or the Accountability Officer will activate the portable computer 52 and log into the computer program coupled to the system 10 via the wireless communication network 58. The first responders, for example, firefighters, will each acquire a PTU 150, and, if a voice system 54 is not included with the PTU 150, a radio for communicating with the Accountability Officer and other firefighters by voice. The PTU 150 is in the neutral (initial) position when at the location of the firetruck 102. The computer program will display the position of one or more firefighters on the display screen of the portable computer 52 based on the tracking information transmitted by each PTU 150 using the tracking and positioning methods described above.

Figure 7:
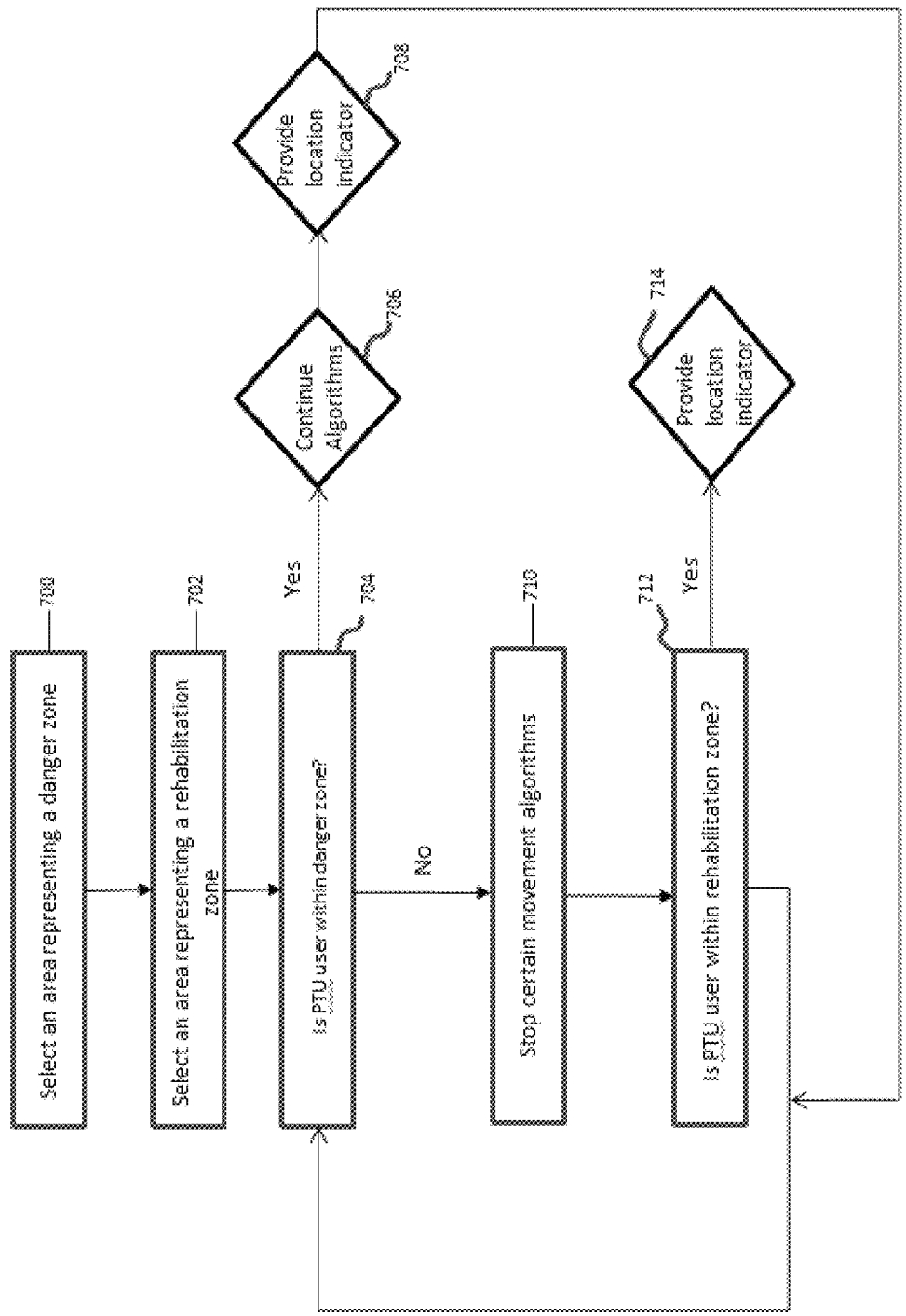
FIG. 7 is a flow chart disclosing the method steps of a configuration of zone identification areas.

In a configuration, the Accountability Officer or other user of the portable computer 52 may identify various work zones using geofencing and the GUI of the computer program. The user of the portable computer 52, may, for example, select an area considered to be the danger zone and/or a rehabilitation area. The danger zone, in one configuration, may be a representation of a burning building and a forty (40) foot radius around the building displayed on the GUI and the rehabilitation area may represent where the rehabilitation truck, for example, an ambulance is positioned at the scene of an emergency. Thus, when an individual with a PTU 150 is outside of the danger zone, certain algorithms, including but not limited to the posture and motion detection algorithms may not be processed by the processors 104, 180. An indicator may be provided on the GUI to indicate the zone location of an individual wearing a PTU. For example, an icon representing a particular individual wearing a PTU may change to different colors when in each of the different zones. As shown in FIG. 7, the method steps may include, but are not limited to a user of the portable computer 52 first selecting an area on the display representing the danger zone and rehabilitation zone according to steps 700 and 702. Next, the system 10 will determine if the PTU 150 user is in the danger zone 704. If the answer is yes, the processors 104, 180 will continue to process the algorithms according to step 706. Further, the GUI may provide a location indicator for that particular PTU 150 user indicating that individual is within the danger zone according to step 708. For example, a representation of the user on the display of the portable computer 52 may be red. If the answer is no, certain algorithms will not be processed by the processors 104, 180 according to step 710. As set forth in step 712, the system 10 will determine if the individual is within the rehabilitation zone according to step 712. If the answer is yes, a location indicator may be provided on the display of the GUI showing the PTU 150 user is in the rehabilitation zone according to step 714. For example, a representation of the PTU 150 user on the display of the portable computer 52 of the PTU 150 user in the rehabilitation zone may include the color yellow.

Figure 8:
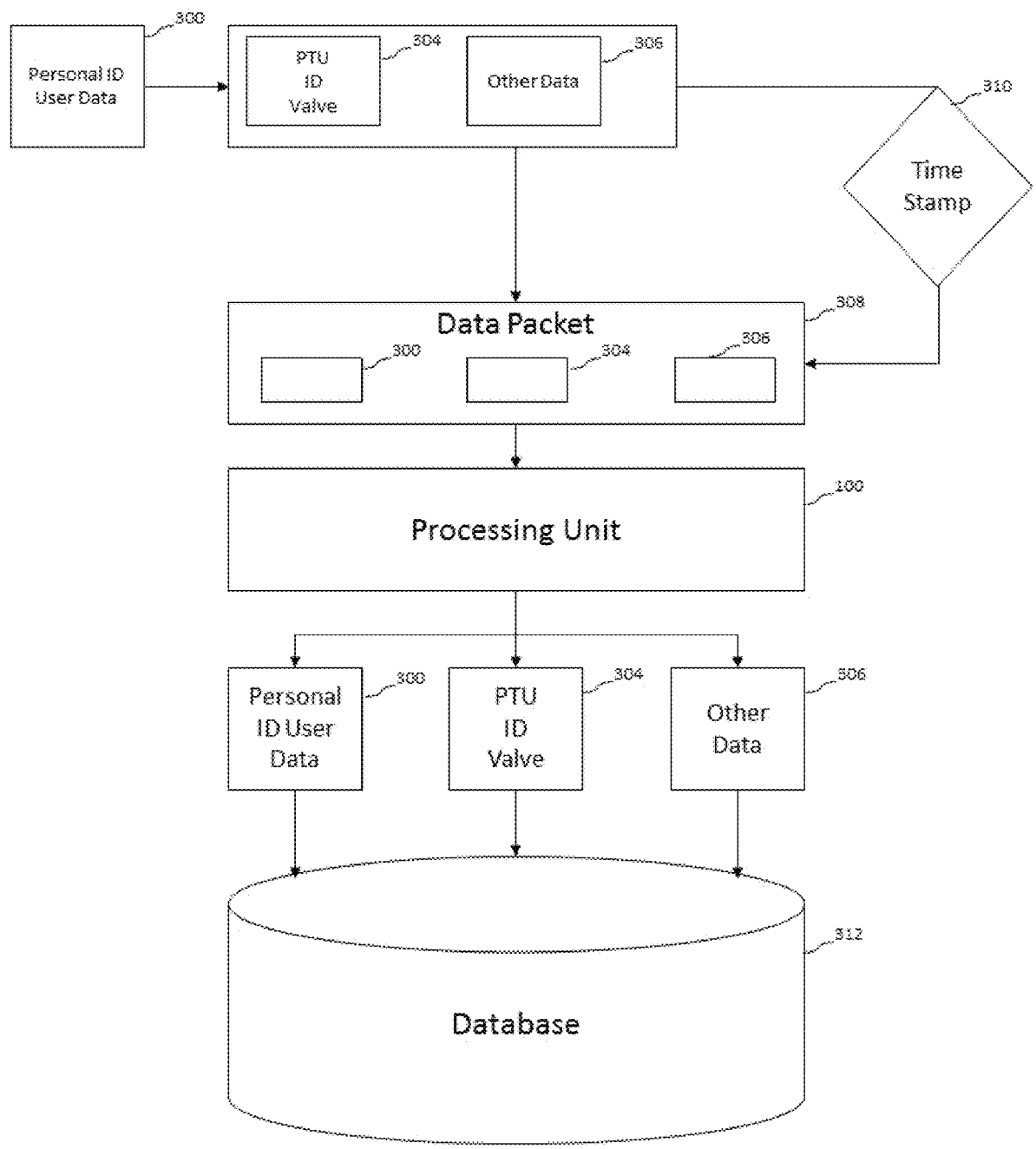
FIG. 8 is a flow chart showing the method steps of a configuration of the coupling of the Personal ID user data with the PTU.

In one configuration, the PTU 150 slides into a holder that may be worn by the individual. For example, a firefighter may have a clip that is pre-pinned to the firefighter's jacket, wherein the OIC will receive a notification on the portable computer 52 if the PTU 150 is not properly clipped into the activated position. Each clip includes a stored set of personal identification (PID) user data 300 that is linked to the PTU 150 obtained by the individual through radio frequency signals. Having unique identification values embedded within the PTUs only may be problematic in that the same individual must use the same PTU, or the OIC must track which individual is associated with each PTU. In order to solve this problem, each individual is assigned a set of PID user data 300 that is unique to that individual, which may be stored by a PTU holding device or other type of device that is separate from the PTU and capable of retaining a PID user data 300. The PID user data 300 is then detected by a PTU 150 only when the PTU is proximate to, coupled to, or connected to, the PTU holding device. As shown in FIG. 8, the set of PID user data 300, which is unique to that particular individual, may be bundled in a data packet 308 having other values, and then transmitted to the processing unit 100 by the PTU 150. For example, each PTU 150 includes a chipset 200 or similar component providing a unique identification value 304 of the PTU 150, and this information may be bundled in the same data packet 308 having the PID user data 300. The data packet 308 may also include other data 306, which may include, but is not limited to, one or more of the following: biometric data from the sensors, voice, gas measurements at the location, and air supply values from the SCBA device. In one configuration, the data packet 308 is time stamped 310 by the PTU 150 and transmitted to the processing unit 100. The processing unit 100 unbundles the data packet 308, separating the data and allocating the data into a database 312. Thus, the display of the portable computer 52 and/or the display of the PTU 150 may identify the individual associated with the PTU.

The PTU 150 will send a signal to the server continuously until the PTU 150 receives a confirmation signal confirming connectivity and successful login. Once the PTU 150 is connected to the system 10, the PTU 150 will transmit the HD user data 300 to the command unit through the processing unit 100 permitting the OIC to identify the individual, and in some configurations, the linked PTU 150 on the display of the portable computer 52. In an alternative configuration, the PID user data 300 is a component within the PTU 150, wherein the HD user data 300 is a near field RFID tag having the individual's identification embedded within the PTU 150. The RFID tag sends the user data 300 to the RFID transceiver 132 of the processing unit 100.

As the firefighter moves around the scene of the emergency, the PTU 150 will collect raw data from the various sensors 164, 166, 168, or 170 of the IMU 162 and from any additional sensors 172. The PTU 150 will track movement in all Cartesian directions (x, y, and z). Preferably, the movement of each firefighter is be tracked every $\frac{1}{20}^{th}$ of a second, however, it should be appreciated by those having ordinary skill in the art that a movement may be tracked at smaller or larger intervals. Each PTU 150 can communicate with each other if within a distance of approximately 300 meters and more preferably within a distance of 400 meters. Any PTU 150 within the range of the processing unit 100 will be able to send and receive signals to and from the processing unit 100 over the wireless communication network 140. Using this method, the PTU 150 may transmit and receive signals to and from the other PTUs and to and from the processing unit 100 either directly or through another PTU, regardless of whether the individual and the PTU is in a structure made of concrete, metal, wood, plastic, or other type of building material. If all PTUs are within range of one another, a plurality of connectivity lines can be created as shown in FIG. 2.

As with most electronic systems, it is necessary to control the temperature, humidity, and other physical factors that may affect the reliability and accuracy of the processing unit 10 and PTUs 150. The radio location sensors 56, 112, 158, for example, may be temperature dependent as the radio wave based positioning depends of the Time Delay Of Arrival (TDOA) of the electromagnetic signal from the transmitter to receiver. If the transceivers 105, 151 are subjected to high temperature, the timing unit 120, 176 (the crystal) pulse count will vary resulting in an incorrect time estimation and incorrect positioning. Also, the other sensors such as the IMU sensors 164, 166, 168, 169, or MEMS sensor 170, and GPS satellite receiver 60, 106, 160 are dependent on temperature. The desired operating temperature range may be approximately −40 to 158 degrees Fahrenheit, and more preferably between −20 to 125 degrees Fahrenheit. Their measurements will have error due to temperature, shock and humidity. To remove major noise sources and nonlinearities, and to prevent errors due to these physical conditions, these sensors are calibrated at different physical conditions.

Since temperature, humidity and other physical factors affect the reliability and accuracy of the system 10, one configuration includes a temperature control system 178 as part of the PTU 150 to keep the temperature and humidity within the desired operating range and to protect the electronics from extreme ambient temperatures. The command unit 50 and the processing unit 100 may also include a temperature control system 62, 134, respectively. The ambient temperature measurement determined by the temperature sensor 172 may be used to create the heat map and may also be used to determine the temperature surrounding the circuit board of PTUs 150.

In the event an individual requires help or is in danger, the individual can so indicate by activating a distress call by activating a distress call button within the system 10. In one configuration, the individual activates a button 186 on the PTU 150 to activate the distress call. The user of the portable computer 52, upon receiving such call or an automated alarm, will use the computer program on the portable computer 52 to alert other individuals within the structure. The alert may be provided to the user of the portable computer 52 through the computer program with a visual, audible and/or vibrational component. The system 10 may also detect non-movement of an individual, or unusual movements that could indicate the individual has fallen down or subject to an explosion and send an alert to the user of the portable computer 52. To detect non-movement, data from the PTU 150 may be analyzed by the PTU 150 via the well-known "No Movement Algorithm" and "Beyond Human Limitation Algorithm." The "No Movement Algorithm" quantifies the time that a PTU 150 has not had any movement. In one configuration, the threshold to define movement is one (1) foot and the rate of movement is less than one and one half (1.5) feet per second. For example, if the individual does not move more than 2 feet in a predetermined amount of time, the processing unit 100 will transmit an alert to the portable computer 52. In the event the PTU 150 is unable to transmit its position, the processing unit 100 will continuously record the last known position for such individual. Communication between a particular PTU 150 and the processing unit 100 may fail in the event such PTU is not within the range of other PTUs or the processing unit 100, or none of the PTUs are within the range of the processing unit 100. During a period of lost signal between a PTU and the processing unit 100, the PTU 150 will continue to collect data and save it on an internal board memory 188. Upon re-establishment of communication with the processing unit 100, either directly or through other PTUs 150, the data saved on the memory 188 will be transmitted to the processing unit 100. The data stored locally on memory 188 will be time stamped in the PTU 150. In a configuration, the time stamp is not universal time, but rather timekeeping in an incremental manner relative to the time when signal was lost. Moments of lost signal that are less than ten (10) seconds will not be indicated on the display of the portable computer 52. However, in the event signal is lost for ten (10) seconds or more, the portable computer 52 user will be alerted on the portable computer and the last known location of the PTU 150/individual will be displayed as a red alert. Upon the PTU 150 reconnecting to the WANET 140, the PTU 150 will transmit to the processing unit 100 the current data and any additional data generated during the signal loss. The display will permit the user of the portable computer 52 to group the individuals together and label the group by their job assignment.

The system 10 will also monitor whether an individual has exceeded the limits of human movement and speed by applying the Beyond Human Limitation Algorithm to tracking data transmitted by a PTU 150. In one configuration, the threshold to define the limitation in the x and y axis is 10 mph and the threshold to define the limitation in the z axis is 3.5 mph. The PTU 150 will measure these speeds and transmit the data to the processing unit 100. If these speeds are exceeded, the processing unit 100 will send an alert to the portable computer 52 to notify the portable computer 52.

The alert types may be assigned different colors indicating the severity and type of danger. For example, the indicator for non-movement of an individual using a PTU 150 may be yellow in the event no movement is detected for fifteen (15) seconds and proceed to red at twenty (20) seconds. The indicator values may be adjusted within the computer program.

Figure 9:
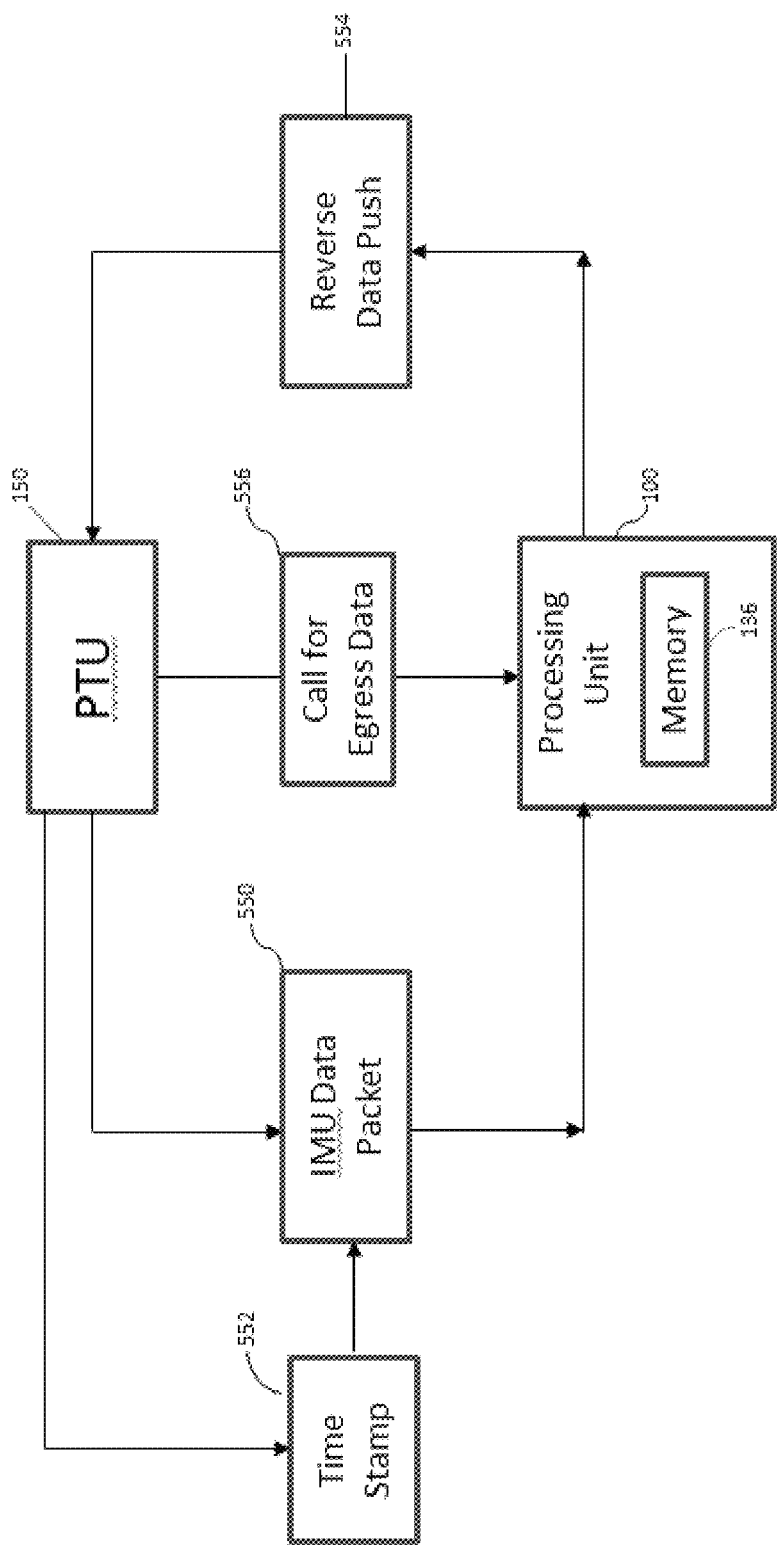
FIG. 9 is a flow chart disclosing the method steps of a configuration of the egress map system.

The system 10 may provide an egress map to individuals wearing a PTU 150 showing the individual's measured path in reverse. In one configuration, as shown in FIG. 9, the PTU 150 sends an IMU data packet 550 that is time stamped 552 to the processing unit 100. In another configuration, the processing unit 100 time stamps the data packet 550. The processing unit 100 stores the data in memory 136. Through a reverse data push 554, the processing unit 100 will send to the PTU 150 the reverse tracking information of the individual. It is contemplated that the reverse data push may be automatic or at the request of an individual wearing the PTU 150. Thus, an individual wearing a PTU 150 in a building or other emergency environment will be guided to the exit based on previous steps. In some configurations, the map of a building subject to the emergency is known prior to the event. Thus, the closest entrances, exits and/or windows can be identified and the individual wearing the PTU 150 can be guided by the PTU 150 to the closest escape via an egress map communicated from the processing unit 100 to the PTU. In one configuration, the egress data is provided to the PTU 150 upon a request 556 by the user of the PTU 150. Such building maps may be created during new building walkthroughs, building inspections, by the SLAM unit 119, or otherwise. The egress map may be displayed on a wrist display, on the visor of a first responder, or by other devices worn by the first responder. In a configuration of the invention, a large arrow is displayed providing directional guidance (N, S, E, W). The display may change colors or include a secondary arrow to indicate a change of elevation to the individual.

Figure 10:
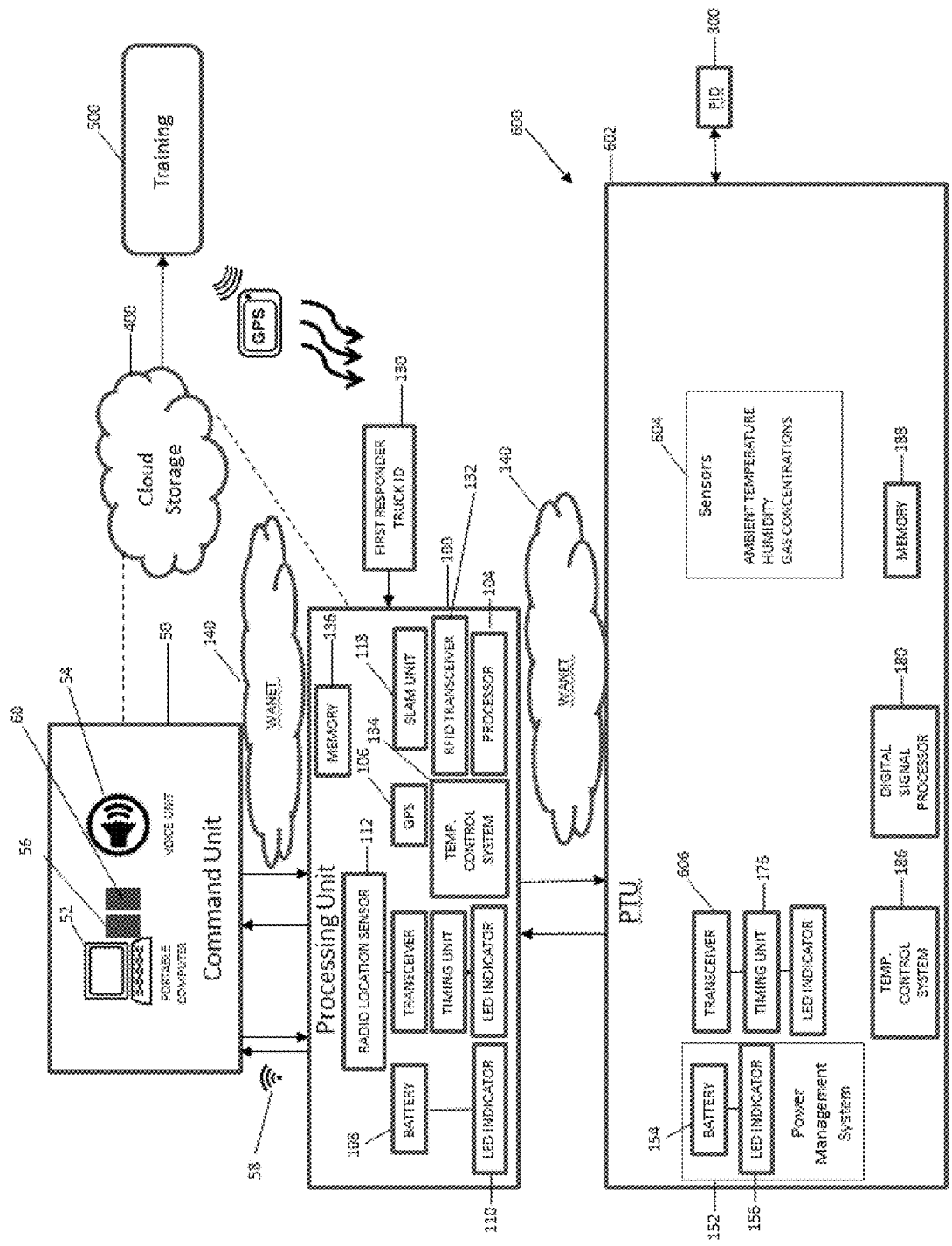
FIG. 10 is a schematic representation of the device for determining the environmental conditions in an enclosed space.

In yet another configuration, as shown in FIG. 10, the PTU is a device 600 for determining the environmental conditions in an enclosed space. The device 600 includes a housing 602 having a sensor module 604 for collecting a plurality of data points. In one configuration, the sensor module 604 measures the concentration of gas of carbon dioxide levels, carbon monoxide levels, hydrogen cyanide levels, phosgene levels, oxygen levels, and/or other chemicals. The sensor module 604 may also measure ambient temperature, pressure, vibration, radiation, humidity, and/or other environmental elements. The device 600 further comprises a transceiver 606 coupled to a wireless communication network 140 for sending a plurality of data points to a processing unit 100. The processing unit includes a processor for comparing the plurality of data points to a set of acceptable data points limits and determining if the plurality of data points is within the acceptable data point limits. If the data points are determined to be outside the acceptable range, the processing unit 100 communicates an alert to one of a command unit 50 and the device 600. For example, the alarm may sound if the carbon dioxide levels are greater than 1,000 ppm, carbon monoxide levels are greater than 70 ppm, hydrogen cyanide levels are greater than 8 ppm, and/or if the phosgene levels are greater than 2 ppm.

Figure 13:
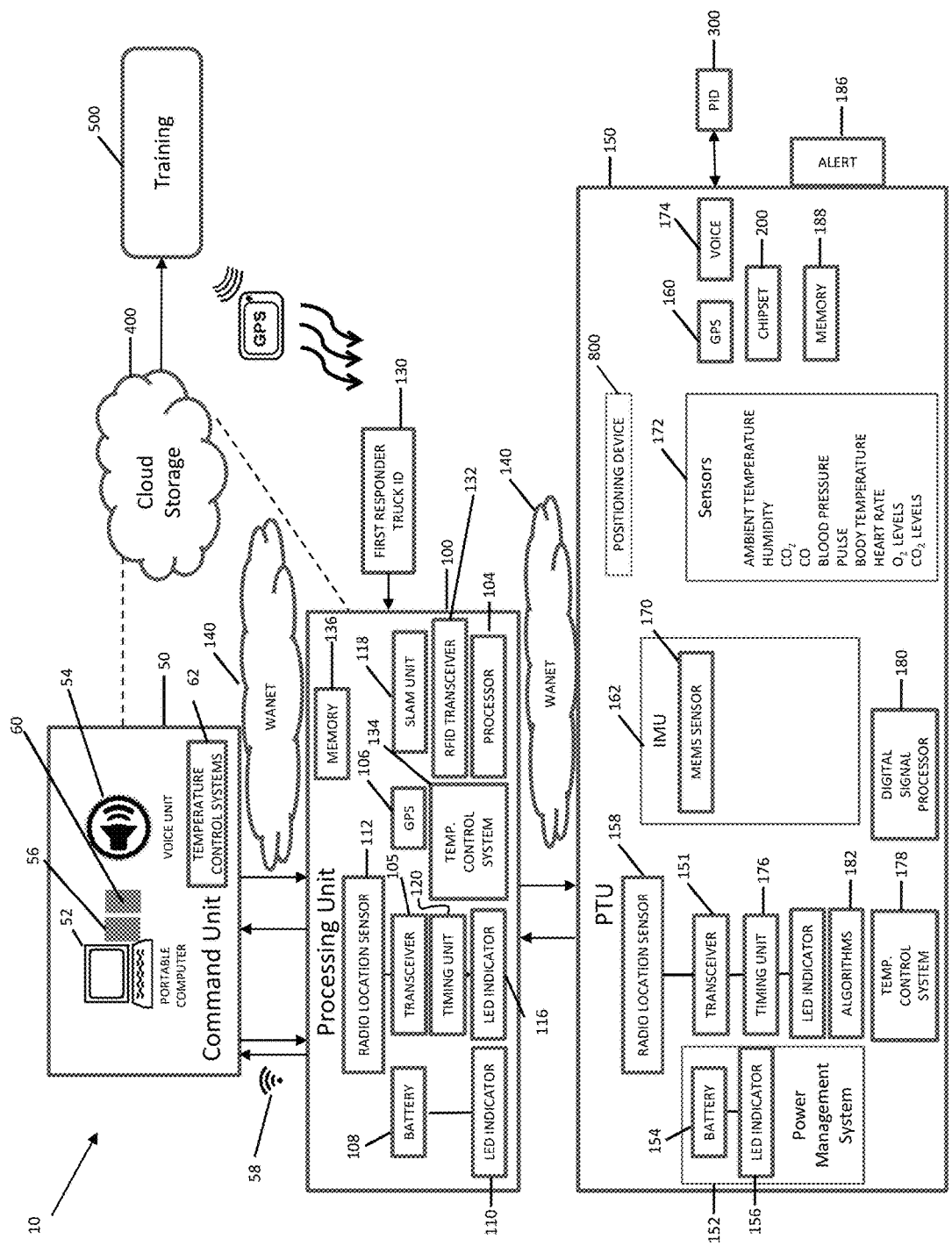
FIG. 13 is a schematic representation of an alternative configuration of the present system.

Referring now to FIG. 13, in an alternative configuration of the present system 800, the system utilizes the Earth's magnetic field (EMF) to enable positioning of an individual. The EMF may be utilized independently or in combination with GPS 160, radio location sensor 158, and/or IMU 162. In one configuration, the PTU 150 is as described supra, and includes a positioning device 800. The positioning device 800 may comprise a magnetometer or another sensor capable of measuring an EMF field. The magnetometer may be, for example, a Hall sensor or a digital compass. In one configuration, the positioning device is a group magnetometer, or a magnetometer array. In another configuration, the positioning device is magnetometer 169. The positioning device measures an EMF vector. In one configuration, the magnetometer measures a three-dimensional magnetic field vector. The EMF vector measured by the positioning device may be compared to an indoor Earth's magnetic field map, which comprises existing information, such as EMF vector magnitude and direction in several locations within a building or several buildings. The EMF map may be generated by taking a plurality of EMF measurements at a plurality of locations in one or more building. The EMF measurements may be generated using a mapping device. The EMF measurements may include the magnitude and direction of the Earth's magnetic field. In one configuration, the mapping device is a mobile device having a magnetometer and/or radio interference components. The positioning device 800 or 169 may have the EMF map stored within the positioning device itself, within the memory 188 of the PTU 150, or stored elsewhere on a network accessible by the positioning device. Alternatively, the PTU 150 may forward the EMF vector data to the processing unit 100 having the EMF map stored in memory 136 or having access to the EMF map stored in a database or server, for example, cloud storage 400, accessible through a network. The EMF vector measured by the positioning device is compared to the indoor Earth's magnetic field map to determine the location of the user in the building. It should be appreciated by those having ordinary skill in the art that the EMF map may include extensive amounts of data. Thus, in one configuration, only a portion of the EMF map is used based on a location estimate measured by the PTU 150. That is, the IMU 162, Radio location sensor 158, and/or GPS 160 may measure the location of an individual and the PTU 150 and/or processing unit 100 may determine a location estimation of the individual. A portion of the EMF map is selected based on this location estimate. Then, the EMF vector measurements are compared to the EMF map portion to determine a location of an individual.

Figure 14:
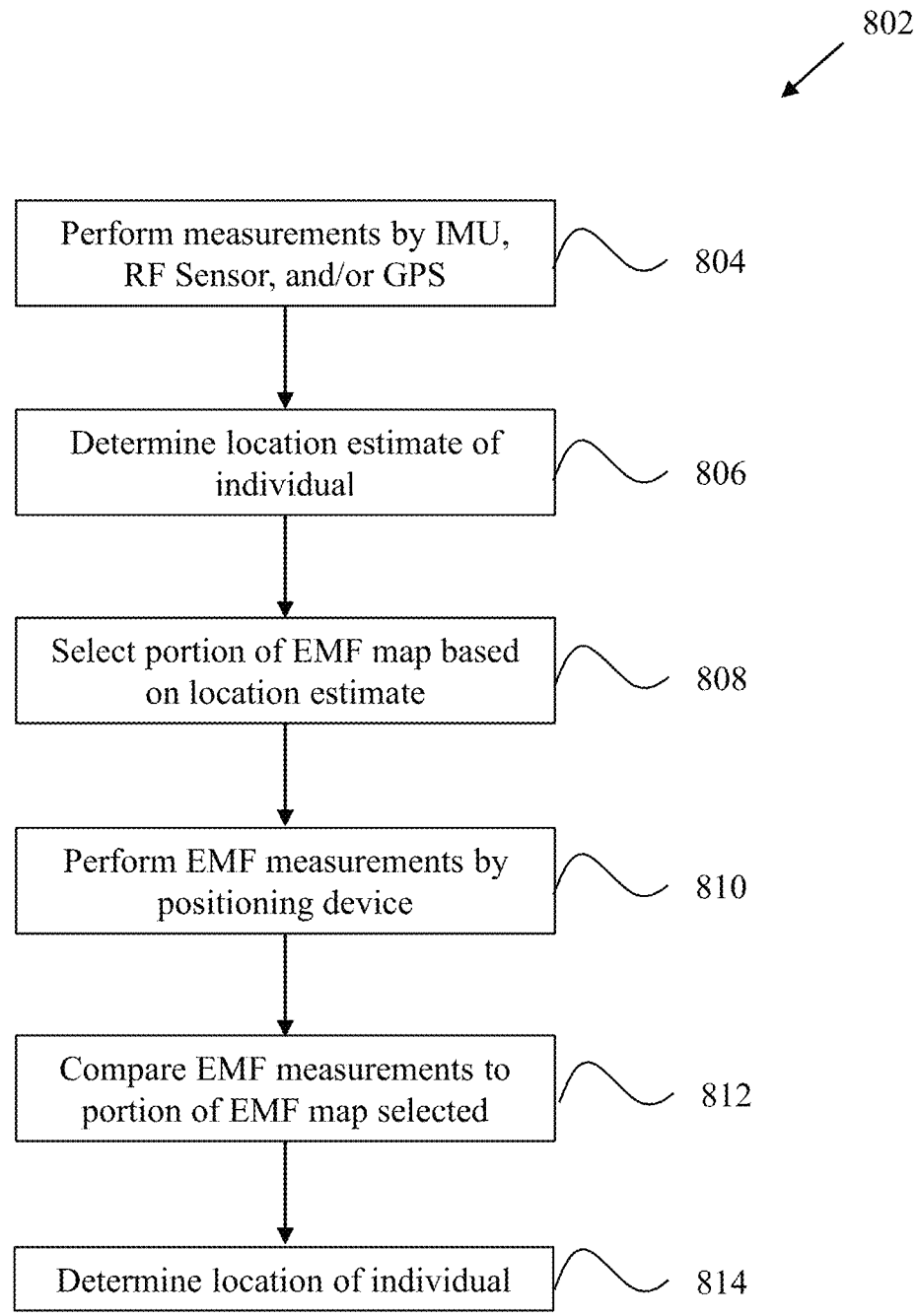
FIG. 14 is a flow chart disclosing the method steps of a configuration of location determination of an individual.

As set forth in FIG. 14, in one configuration, a method of location determination 802 is shown. In this method 802, using the PTU 150, measurements by the IMU 162, radio location sensor 158, and/or GPS 160 are performed according to step 804. Then, a location estimate of the individual having the PTU 150 is determined according to step 806. In one configuration, the measurements performed by the IMU 162 include measurement data from the accelerometer 164, gyroscope 166, or alternatively, from the MEMS sensor 170, which is processed by digital signal processor 180 with numerical integrations 208, 210. The resulting position, velocity and altitude determinations may be fed to a statistical filter 204, as described supra. In an alternative configuration, the measurements performed by the IMU 162 are transmitted to the processing unit 100, where data is processed by processor 104 to determine the location estimate of the individual having the PTU 150. Data from the additional sensors 202 may also be processed by the processor 180 and/or 104, and if available, GPS 160, may also be used to determine the location estimate of the individual having the PTU 150. This location estimate provides a basis for selecting a portion of the EMF map according to step 808. The processor 180 of the PTU 150 or the processor 104 of the processing unit 100 selects the relevant portion of the EMF map based on the location estimate. The relevant portion of the EMF map includes the area surrounding the location of the PTU 150. The relevant portion of the EMF map may include a floor of a building, a portion of a room, a multi-floor section of a building, or any other part of the EMF map relevant to the location of the individual having the PTU 150. The EMF map may be stored in the memory of the PTU 150 and/or the memory of the processing unit 100. The EMF measurements may also be performed by the positioning device according to step 810. As set forth in step 812, the EMF measurements are compared to the portion of the EMF map selected based on the location estimate. Finally, according to step 814, the location of the individual having the PTU 150 is determined.

In one configuration, a location of an individual having a PTU 150 may be determined, in part, by using Indooratlas® location technology, which can be found at http://www.indooratlas.com. Background information regarding the Indooratlas® technology can be found in the white papers titled "Ambient Magnetic Field-Based Indoor Location Technology" available at http://web.indooratlas.com/web/WhitePaper.pdf, and "Magnetic Positioning: The Arrival of 'Indoor GPS' available at https://www.indooratlas.com/wp-content/uploads/2016/03/magneticpositioning opus_jun2014.pdf, the entirety of each article hereby incorporated by reference.

The location of the individual may be displayed on a GUI of a portable computer 52 and/or on a GUI of the PTU 150. The PTU 150 may include, for example, a wrist-mounted device that shows relevant information, such as location information, temperature data, structural stability, the individual's biometrics and/or an egress map.

The present invention contemplates that many changes and modifications may be made. Therefore, while the presently-preferred form of the system has been shown and described, and several modifications and alternatives discussed, persons skilled in the art will readily appreciate that various additional changes and modifications may be made without departing form the scope of the invention, as defined and differentiated by the following claims.

The invention claimed is:

1. A first responder system comprising:
 (a) a command unit coupled to a wireless communication network;
 (b) a processing unit operably coupled to the command unit;
 (c) a first personal tracking unit (PTU) configured to be worn by and associated with a first individual, the first PTU having at least one data collecting sensor for tracking location data of the first PTU corresponding with a location of the first PTU within a structure, and an ambient temperature sensor for measuring ambient temperature data at the location of the first PTU within the structure, wherein the first PTU is in communication with the wireless communication network and is operative to transmit signals of the location data from the at least one data collecting sensor and the ambient temperature data from the ambient temperature sensor of the first PTU; and
 (d) a second personal tracking unit (PTU) configured to be worn by and associated with a second individual, the second PTU having at least one data collecting sensor for tracking location data of the second PTU corresponding with a location of the second PTU within the structure, and an ambient temperature sensor for measuring ambient temperature data at the location of the second PTU within the structure, wherein the second PTU is in communication with the wireless communication network and is operative to transmit signals of the location data from the at least one data collecting sensor and the ambient temperature data from the ambient temperature sensor of the second PTU,
 and wherein each PTU, the processing unit or the command unit couples the location data received from each of the first PTU and the second PTU with the ambient temperature data obtained from each of the first PTU and second PTU, to generate a visual illustration of the ambient temperature data coupled to the location data obtained from each of the first PTU and second PTU in the form of a map.

2. The first responder system of claim 1, wherein the signals of the location data from the at least one data collecting sensor and the ambient temperature data from the ambient temperature sensor of each of the first PTU and the second PTU include data packets time-stamped by the first PTU and second PTU, respectively, and wherein the map is generated by either the processing unit or the command unit based on the time-stamped data packets comprising the ambient temperature data and location data signals received from each PTU.

3. The first responder system of claim 1, wherein the processing unit couples the location data received from the first PTU and the second PTU with a preexisting structure map to generate a synthesized map having the location of at least the first PTU.

4. The first responder system of claim 3, wherein the synthesized map is transmitted from the processing unit to at least the first PTU located within that portion of the structure corresponding to the synthesized map.

5. The first responder system of claim 1, wherein the location data of the first PTU forms an egress map of the first PTU, and wherein the egress map is transmitted to the first PTU as a reverse data push of the location data of the first PTU showing the first PTU's path in reverse.

6. The first responder system of claim 1, wherein the temperature sensor measures an internal temperature of the first PTU.

7. The first responder system of claim 1 further comprising a second temperature sensor for measuring an internal temperature of the first PTU.

8. The first responder system of claim 1 further comprising a sensor for measuring biometric data of the first individual associated with the first PTU.

9. A first responder system comprising a first personal tracking unit (PTU) configured to be worn by and associated with a first individual, the first PTU having at least one data collecting sensor for tracking location data of the first PTU corresponding with a location of the first PTU within a structure, a processor, a display, and an ambient temperature sensor for measuring temperature data at the location of the first PTU within the structure, wherein the first PTU, the processor, or the command unit couples the ambient temperature data with the location data and a time stamp to generate a visual illustration of the ambient temperature data in relation to time in the form of a heat map of the location of the first PTU within the structure to be displayed on the display.

10. The first responder system of claim 9, wherein the at least one data collecting sensor for tracking location data of the first PTU within the structure comprises at least two of a GPS, an IMU, a magnetometer, and a radio location sensor, and wherein the location of the first PTU is determined based on the location data collected from the at least two of the GPS, IMU, magnetometer, and radio location sensor.

11. The first responder system of claim 9, wherein the first PTU further comprises a mobile transceiver in wireless communication with a processing unit remote from the first PTU over a wireless communication network, wherein the first PTU is coupled to a first set of user identification data of the first individual and wherein the first PTU is operative to transmit signals representing the first individual's user identification data, and the location and temperature data at the location of the first individual over the wireless communication network to the processing unit.

12. The first responder system of claim 9, wherein the temperature sensor measures an internal temperature of the first PTU.

13. The first responder system of claim 9 further comprising a second temperature sensor for measuring an internal temperature of the first PTU.

14. The first responder system of claim 9 further comprising a sensor for measuring biometric data of the first individual associated with the first PTU.

15. The first responder system of claim 11, further comprising a second PTU having at least one data collecting sensor for tracking location data of the second PTU corresponding with a location of the second PTU within the structure, a mobile transceiver in wireless communication with the processing unit remote from the first PTU and the second PTU over the wireless communication network, a display, and a temperature sensor for measuring temperature data of the second PTU within the structure, the second PTU coupled to a second set of user identification data of a second individual and being operative to transmit signals representing the second individual's user identification data, and the location temperature data at the location of the second individual over the wireless communication network to the processing unit if the second PTU is within a first distance.

16. The first responder system of claim 15, wherein the wireless communication network is an ad hoc network utilizing an ultra-wideband network, and wherein the mobile transceiver of the first PTU is operative to receive signals over the ultra-wideband network from the mobile transceiver of the second PTU if the second PTU is positioned within the first distance from the mobile transceiver and beyond the first distance from the processing unit, wherein the mobile transceiver of the first PTU transmits the signals from the mobile transceiver of the second PTU to the processing unit.

17. The first responder system of claim 15, wherein the processing unit generates a heat map of the locations of the first PTU and the second PTU based on the temperature data and location data signals received from the first PTU and the second PTU.

18. The first responder system of claim 15, wherein the processing unit couples the location data received from the first PTU and the second PTU with a preexisting structure map to generate a synthesized map having the location of at least the first PTU.

19. A first responder system comprising:
(a) a first personal tracking unit (PTU) configured to be worn by an associated with a first individual;
(b) a command unit in wireless communication with the first PTU; and
(c) a processing unit remote from the first PTU in wireless communication with the first PTU, wherein the first PTU comprises at least one ambient data collecting sensor for tracking location data of the first PTU corresponding with a location of the first PTU within a structure, a first mobile transceiver in wireless communication with the processing unit, an temperature sensor for measuring temperature data within the location of the first PTU, and a display, the first PTU coupled to a first set of user identification data of a first individual and being operative to transmit signals representing the first individual's location data and the ambient temperature data of the first individual's location to the processing unit, wherein the first PTU, the processing unit, or the command unit couples the location data received from the first PTU with the ambient temperature data obtained from the first PTU and a time stamp to generate a visual illustration of the ambient temperature data in relation to time in the form of a heat map of the location of the first individual.

20. The first responder system of claim 19, wherein the first PTU further comprises a processor.

21. The first responder system of claim 19, further comprising a second PTU configured to be worn by an associated with a second individual having at least one data collecting sensor for tracking location data of the second PTU corresponding with a location of the second PTU within the structure, a mobile transceiver in wireless communication with the processing unit, a display, and an ambient temperature sensor for measuring temperature data of the second PTU within the structure, the second PTU coupled to a second set of user identification data of a second individual and being operative to transmit signals representing the second individual's user identification data, and the location data and the ambient temperature data of the second individual's location to the processing unit if the second personal tracking unit is within a first distance.

22. The first responder system of claim 21, wherein the second PTU is operative to transmit signals representing the second individual's user identification, location data, and ambient temperature data to the first PTU if the second PTU is within the first distance to the first PTU.

23. The first responder system of claim 19, wherein the display of the first PTU is mounted to the wrist of the first individual.

24. The first responder system of claim 21, further comprising a voice system for voice communication between the command unit, the first PTU and the second PTU.

25. The first responder system of claim 19, wherein the temperature sensor measures an internal temperature of the first PTU.

26. The first responder system of claim 19 further comprising either (i) a temperature sensor for measuring an internal temperature of the first PTU; or (ii) a sensor for measuring biometric data of an individual associated with the first individual.

27. The first responder system of claim 2, wherein the map is a heat map comprising color changes representing changes in temperature based on the ambient temperature data received from one of the PTUs overlying a map display of the internal structure of the building.

28. The first responder system of claim 1, wherein the generated map is a map of a surrounding environment.

* * * * *